US00RE47201E

(19) United States
(12) Reissued Patent
Chishti et al.

(10) Patent Number: US RE47,201 E
(45) Date of Reissued Patent: Jan. 8, 2019

(54) USE OF ABSTRACTED DATA IN PATTERN MATCHING SYSTEM

(71) Applicant: Afinti International Holdings Ltd., Hamilton (BM)

(72) Inventors: Zia Chishti, Washington, DC (US); Akbar A. Merchant, Bethesda, MD (US)

(73) Assignee: Afiniti International Holdings, Ltd., Hamilton (BM)

(21) Appl. No.: 15/216,931

(22) Filed: Jul. 22, 2016

Related U.S. Patent Documents

Reissue of:
(64) Patent No.: 8,792,630
Issued: Jul. 29, 2014
Appl. No.: 14/032,657
Filed: Sep. 20, 2013

U.S. Applications:
(63) Continuation of application No. 15/209,512, filed on Jul. 13, 2016, now Pat. No. Re. 46,986, which is an application for the reissue of Pat. No. 8,792,630.
(Continued)

(51) Int. Cl.
*H04M 3/00* (2006.01)

(52) U.S. Cl.
CPC ..... *H04M 3/00* (2013.01)

(58) Field of Classification Search
CPC ..... H04M 3/00
(Continued)

(56) References Cited

U.S. PATENT DOCUMENTS 5,155,763 A 10/1992 Bigus et al.
5,206,903 A 4/1993 Kohler et al.
5,327,490 A 7/1994 Cave
5,537,470 A 7/1996 Lee
5,702,253 A 12/1997 Bryce et al.
(Continued)

FOREIGN PATENT DOCUMENTS

AU 2008349500 C1 5/2014
AU 2009209317 B2 5/2014
(Continued)

OTHER PUBLICATIONS

Anonymous. (2006) "Performance Based Routing in Profit Call Centers," The Decision Makers' Direct, located at www.decisioncraft.com, Issue Jan. 6, 2012 (3 pages).
(Continued)

*Primary Examiner* — Catherine M Tarae
(74) *Attorney, Agent, or Firm* — Wilmer Cutler Pickering Hale and Dorr LLP

(57) ABSTRACT

Method, system and program product, for operating a call center system, the method comprising: obtaining performance data for agents in a set of agents; obtaining a respective abstracted data stream for multiple calls, each respective data stream having multiple different locations along the abstracted data stream representing multiple different respective fields, the meaning for the field data in the respective different locations for the different respective fields not known by the system; determining respective patterns for the respective data streams; obtaining performance data for the respective patterns; matching using a selected matching algorithm one of the agents from the set of agents to one of the calls based at least in part on the performance data for the respective pattern of the call and on performance data for the respective agents of the set of agents.

20 Claims, 7 Drawing Sheets

Related U.S. Application Data

(60) Provisional application No. 61/705,040, filed on Sep. 24, 2012.

(58) Field of Classification Search
USPC ..... 379/265.01
See application file for complete search history.

(56) References Cited

U.S. PATENT DOCUMENTS 5,825,869 A 10/1998 Brooks et al. ..... H04M 3/5233 379/265.12
5,903,641 A 5/1999 Tonisson
5,907,601 A 5/1999 David et al.
5,926,538 A 7/1999 Deryugin et al.
6,021,428 A * 2/2000 Miloslavsky ..... G06Q 10/107 348/E7.082
6,044,468 A * 3/2000 Osmond ..... H04L 41/0213 380/281
6,049,603 A 4/2000 Schwartz et al.
6,052,460 A 4/2000 Fisher et al.
6,064,731 A 5/2000 Flockhart et al.
6,088,444 A 7/2000 Walker et al.
6,163,607 A 12/2000 Bogart et al.
6,222,919 B1 4/2001 Hollatz et al.
6,292,555 B1 9/2001 Okamoto
6,324,282 B1 11/2001 McIllwaine et al.
6,333,979 B1 12/2001 Bondi et al.
6,389,132 B1 5/2002 Price
6,389,400 B1 5/2002 Bushey et al.
6,408,066 B1 6/2002 Andruska et al.
6,411,687 B1 6/2002 Bohacek et al.
6,424,709 B1 7/2002 Doyle et al.
6,434,230 B1 8/2002 Gabriel
6,496,580 B1 12/2002 Chack
6,504,920 B1 1/2003 Okon et al.
6,519,335 B1 2/2003 Bushnell
6,519,568 B1 * 2/2003 Harvey ..... G01V 11/002 702/14
6,535,601 B1 3/2003 Flockhart et al.
6,570,980 B1 5/2003 Baruch
6,587,556 B1 7/2003 Judkins et al.
6,603,854 B1 8/2003 Judkins et al.
6,639,976 B1 10/2003 Shellum et al.
6,661,889 B1 12/2003 Flockhart et al.
6,704,410 B1 3/2004 McFarlane et al.
6,707,904 B1 3/2004 Judkins et al.
6,714,643 B1 3/2004 Gargeya et al.
6,763,104 B1 7/2004 Judkins et al.
6,774,932 B1 8/2004 Ewing et al.
6,775,378 B1 8/2004 Villena et al.
6,798,876 B1 * 9/2004 Bala ..... 379/265.12
6,829,348 B1 12/2004 Schroeder et al.
6,832,203 B1 12/2004 Villena et al.
6,859,529 B2 2/2005 Duncan et al.
6,922,466 B1 7/2005 Peterson et al.
6,937,715 B2 8/2005 Delaney
6,956,941 B1 10/2005 Duncan et al.
6,970,821 B1 11/2005 Shambaugh et al.
6,978,006 B1 12/2005 Polcyn
7,023,979 B1 4/2006 Wu et al.
7,039,166 B1 5/2006 Peterson et al.
7,050,566 B2 5/2006 Becerra et al.
7,050,567 B1 5/2006 Jensen
7,062,031 B2 6/2006 Becerra et al.
7,068,775 B1 6/2006 Lee
7,092,509 B1 8/2006 Mears et al.
7,103,172 B2 9/2006 Brown et al.
7,158,628 B2 1/2007 McConnell et al.
7,184,540 B2 2/2007 Dezonno et al.
7,209,549 B2 4/2007 Reynolds et al.
7,231,032 B2 6/2007 Nevman et al.
7,231,034 B1 6/2007 Rikhy et al.
7,236,584 B2 6/2007 Torba
7,245,716 B2 7/2007 Brown et al.
7,245,719 B2 7/2007 Kawada et al.
7,266,251 B2 9/2007 Rowe
7,269,253 B1 9/2007 Wu et al.
7,353,388 B1 4/2008 Gilman et al.
7,398,224 B2 * 7/2008 Cooper ..... 705/7.37
7,593,521 B2 9/2009 Becerra et al.
7,676,034 B1 3/2010 Wu et al.
7,725,339 B1 5/2010 Aykin
7,734,032 B1 6/2010 Kiefhaber et al.
7,826,597 B2 11/2010 Berner et al.
7,864,944 B2 1/2011 Khouri et al.
7,899,177 B1 3/2011 Bruening et al.
7,916,858 B1 3/2011 Heller et al.
7,940,917 B2 5/2011 Lauridsen et al.
7,961,866 B1 6/2011 Boutcher et al.
7,995,717 B2 8/2011 Conway et al.
8,000,989 B1 8/2011 Kiefhaber et al.
8,010,607 B2 8/2011 McCormack et al.
8,094,790 B2 1/2012 Conway et al.
8,126,133 B1 2/2012 Everingham et al.
8,140,441 B2 3/2012 Cases et al.
8,175,253 B2 5/2012 Knott et al.
8,229,102 B2 7/2012 Knott et al.
8,249,245 B2 8/2012 Jay et al.
8,295,471 B2 10/2012 Spottiswoode et al.
8,300,798 B1 10/2012 Wu et al.
8,359,219 B2 1/2013 Chishti et al.
8,433,597 B2 4/2013 Chishti et al.
8,472,611 B2 6/2013 Chishti
8,565,410 B2 10/2013 Chishti et al.
8,634,542 B2 1/2014 Spottiswoode et al.
8,644,490 B2 2/2014 Stewart
8,670,548 B2 3/2014 Xie et al.
8,699,694 B2 4/2014 Chishti et al.
8,712,821 B2 4/2014 Spottiswoode
8,718,271 B2 5/2014 Spottiswoode
8,724,797 B2 5/2014 Chishti et al.
8,731,178 B2 5/2014 Chishti et al.
8,737,595 B2 5/2014 Chishti et al.
8,750,488 B2 6/2014 Spottiswoode et al.
8,781,100 B2 7/2014 Spottiswoode et al.
8,781,106 B2 7/2014 Afzal
8,792,630 B2 7/2014 Chishti et al.
8,824,658 B2 9/2014 Chishti
8,856,869 B1 * 10/2014 Brinskelle ..... H04L 63/08 726/12
8,879,715 B2 11/2014 Spottiswoode et al.
8,903,079 B2 12/2014 Xie et al.
8,929,537 B2 1/2015 Chishti et al.
8,995,647 B2 3/2015 Li et al.
9,020,137 B2 4/2015 Chishti et al.
9,025,757 B2 5/2015 Spottiswoode et al.
9,277,055 B2 3/2016 Spottiswoode et al.
9,300,802 B1 3/2016 Chishti
9,426,296 B2 8/2016 Chishti et al.
2001/0032120 A1 10/2001 Stuart et al.
2001/0044896 A1 * 11/2001 Schwartz ..... G06F 21/31 713/169
2002/0018554 A1 2/2002 Jensen et al.
2002/0046030 A1 4/2002 Haritsa et al.
2002/0059164 A1 5/2002 Shtivelman
2002/0082736 A1 6/2002 Lech et al.
2002/0110234 A1 8/2002 Walker et al.
2002/0111172 A1 8/2002 DeWolf et al.
2002/0131399 A1 9/2002 Philonenko
2002/0138285 A1 9/2002 DeCotiis et al.
2002/0143599 A1 10/2002 Nourbakhsh et al.
2002/0161765 A1 10/2002 Kundrot et al.
2002/0184069 A1 12/2002 Kosiba et al.
2002/0196845 A1 12/2002 Richards et al.
2003/0002653 A1 1/2003 Uckun
2003/0081757 A1 5/2003 Mengshoel et al.
2003/0095652 A1 5/2003 Mengshoel et al.
2003/0169870 A1 9/2003 Stanford
2003/0174830 A1 9/2003 Boyer et al.
2003/0217016 A1 11/2003 Pericle
2004/0028211 A1 2/2004 Culp et al.
2004/0057416 A1 3/2004 McCormack
2004/0096050 A1 5/2004 Das et al.
2004/0098274 A1 5/2004 Dezonno et al.

(56) References Cited

U.S. PATENT DOCUMENTS

| | | | |
|---|---|---|---|
| 2004/0101127 | A1 | 5/2004 | DeZonno et al. |
| 2004/0109555 | A1 | 6/2004 | Williams |
| 2004/0133434 | A1 | 7/2004 | Szlam et al. |
| 2004/0210475 | A1 | 10/2004 | Starnes et al. |
| 2004/0230438 | A1 | 11/2004 | Pasquale et al. |
| 2004/0267816 | A1 | 12/2004 | Russek |
| 2005/0013428 | A1 | 1/2005 | Walters |
| 2005/0043986 | A1 | 2/2005 | McConnell et al. |
| 2005/0047581 | A1 | 3/2005 | Shaffer et al. |
| 2005/0047582 | A1 | 3/2005 | Shaffer et al. |
| 2005/0071223 | A1 | 3/2005 | Jain et al. |
| 2005/0129212 | A1 | 6/2005 | Parker |
| 2005/0135593 | A1 | 6/2005 | Becerra et al. |
| 2005/0135596 | A1 | 6/2005 | Zhao |
| 2005/0187802 | A1 | 8/2005 | Koeppel |
| 2005/0195960 | A1 | 9/2005 | Shaffer et al. |
| 2005/0286709 | A1 | 12/2005 | Horton et al. |
| 2006/0098803 | A1 | 5/2006 | Bushey et al. |
| 2006/0110052 | A1 | 5/2006 | Finlayson |
| 2006/0124113 | A1 | 6/2006 | Roberts, Sr. |
| 2006/0184040 | A1 | 8/2006 | Keller et al. |
| 2006/0222164 | A1 | 10/2006 | Contractor et al. |
| 2006/0233346 | A1 | 10/2006 | McIlwaine et al. |
| 2006/0262918 | A1 | 11/2006 | Karnalkar et al. |
| 2006/0262922 | A1 | 11/2006 | Margulies et al. |
| 2007/0036323 | A1 | 2/2007 | Travis |
| 2007/0071222 | A1 | 3/2007 | Flockhart et al. |
| 2007/0121602 | A1 | 5/2007 | Sin et al. |
| 2007/0121829 | A1 | 5/2007 | Tal et al. |
| 2007/0136342 | A1 | 6/2007 | Singhai et al. |
| 2007/0154007 | A1 | 7/2007 | Bernhard |
| 2007/0174111 | A1 | 7/2007 | Anderson et al. |
| 2007/0198322 | A1 | 8/2007 | Bourne et al. |
| 2007/0274502 | A1 | 11/2007 | Brown |
| 2008/0002823 | A1 | 1/2008 | Fama et al. |
| 2008/0008309 | A1 | 1/2008 | DeZonno et al. |
| 2008/0046386 | A1 | 2/2008 | Pieraccinii et al. |
| 2008/0065476 | A1 | 3/2008 | Klein et al. |
| 2008/0118052 | A1 | 5/2008 | Houmaidi et al. |
| 2008/0152122 | A1 | 6/2008 | Idan et al. |
| 2008/0181389 | A1 | 7/2008 | Bourne et al. |
| 2008/0199000 | A1 | 8/2008 | Su et al. |
| 2008/0267386 | A1 | 10/2008 | Cooper |
| 2008/0273687 | A1 | 11/2008 | Knott et al. |
| 2009/0043670 | A1 | 2/2009 | Johansson et al. |
| 2009/0086933 | A1 | 4/2009 | Patel et al. |
| 2009/0190740 | A1 | 7/2009 | Chishti et al. |
| 2009/0190743 | A1 | 7/2009 | Spottiswoode |
| 2009/0190744 | A1 | 7/2009 | Xie et al. |
| 2009/0190745 | A1 | 7/2009 | Xie et al. |
| 2009/0190746 | A1 | 7/2009 | Chishti et al. |
| 2009/0190747 | A1 | 7/2009 | Spottiswoode |
| 2009/0190748 | A1 | 7/2009 | Chishti et al. |
| 2009/0190749 | A1 | 7/2009 | Xie et al. |
| 2009/0190750 | A1 | 7/2009 | Xie et al. |
| 2009/0232294 | A1 | 9/2009 | Xie et al. |
| 2009/0234710 | A1 | 9/2009 | Hassine |
| 2009/0245493 | A1 | 10/2009 | Chen et al. |
| 2009/0304172 | A1 | 12/2009 | Becerra et al. |
| 2009/0318111 | A1 | 12/2009 | Desai et al. |
| 2009/0323921 | A1 | 12/2009 | Spottiswoode et al. |
| 2010/0020959 | A1 | 1/2010 | Spottiswoode |
| 2010/0020961 | A1 | 1/2010 | Spottiswoode |
| 2010/0054431 | A1 | 3/2010 | Jaiswal et al. |
| 2010/0054452 | A1 | 3/2010 | Afzal |
| 2010/0054453 | A1 | 3/2010 | Stewart |
| 2010/0086120 | A1 | 4/2010 | Brussat et al. |
| 2010/0111285 | A1 | 5/2010 | Chishti |
| 2010/0111286 | A1 | 5/2010 | Chishti |
| 2010/0111287 | A1 | 5/2010 | Xie et al. |
| 2010/0111288 | A1 | 5/2010 | Afzal et al. |
| 2010/0142698 | A1 | 6/2010 | Spottiswoode et al. |
| 2010/0183133 | A1 | 7/2010 | Spottiswoode et al. |
| 2010/0183138 | A1 | 7/2010 | Spottiswoode et al. |
| 2011/0022357 | A1 | 1/2011 | Vock et al. |
| 2011/0031112 | A1 | 2/2011 | Birang et al. |
| 2011/0069821 | A1 | 3/2011 | Korolev et al. |
| 2011/0125048 | A1 | 5/2011 | Causevic et al. |
| 2012/0051536 | A1 | 3/2012 | Chishti et al. |
| 2012/0051537 | A1 | 3/2012 | Chishti et al. |
| 2012/0224680 | A1 | 9/2012 | Spottiswoode et al. |
| 2012/0278136 | A1 | 11/2012 | Flockhart et al. |
| 2013/0003959 | A1 | 1/2013 | Nishikawa et al. |
| 2013/0251137 | A1 | 9/2013 | Chishti et al. |
| 2014/0044246 | A1 | 2/2014 | Klemm et al. |
| 2014/0079210 | A1 | 3/2014 | Kohler et al. |
| 2014/0119531 | A1 | 5/2014 | Tuchman et al. |
| 2014/0341370 | A1 | 11/2014 | Li et al. |
| 2015/0055772 | A1 | 2/2015 | Klemm et al. |

FOREIGN PATENT DOCUMENTS

| | | | |
|---|---|---|---|
| AU | 2009311534 | B2 | 8/2014 |
| CN | 102301688 | B | 5/2014 |
| CN | 102017591 | B | 11/2014 |
| EP | 0 493 292 | A2 | 7/1992 |
| EP | 0 949 793 | | 10/1999 |
| EP | 0 949 793 | A1 | 10/1999 |
| EP | 1 032 188 | A1 | 8/2000 |
| JP | 11-098252 | | 4/1999 |
| JP | 11-098252 | A | 4/1999 |
| JP | 2000-078291 | A | 3/2000 |
| JP | 2000-078292 | | 3/2000 |
| JP | 2000-078292 | A | 3/2000 |
| JP | 2000-092213 | | 3/2000 |
| JP | 2000-092213 | A | 3/2000 |
| JP | 2000-236393 | | 8/2000 |
| JP | 2000-236393 | A | 8/2000 |
| JP | 2001-292236 | | 10/2001 |
| JP | 2001-292236 | A | 10/2001 |
| JP | 2001-518753 | | 10/2001 |
| JP | 2001-518753 | A | 10/2001 |
| JP | 2002-297900 | | 10/2002 |
| JP | 2002-297900 | A | 10/2002 |
| JP | 3366565 | | 1/2003 |
| JP | 3366565 | B2 | 1/2003 |
| JP | 2003-187061 | | 7/2003 |
| JP | 2003-187061 | A | 7/2003 |
| JP | 2004-056517 | A | 2/2004 |
| JP | 2004-227228 | | 8/2004 |
| JP | 2004-227228 | A | 8/2004 |
| JP | 2006-345132 | A | 12/2006 |
| JP | 2007-324708 | | 12/2007 |
| JP | 2007-324708 | A | 12/2007 |
| JP | 2011-511533 | A | 4/2011 |
| JP | 2011-511536 | A | 4/2011 |
| JP | 5421928 | B2 | 2/2014 |
| JP | 5631326 | B2 | 11/2014 |
| JP | 5649575 | B2 | 1/2015 |
| MX | 316118 | | 12/2013 |
| MX | 322251 | | 7/2014 |
| NZ | 587100 | B | 10/2013 |
| NZ | 587101 | B | 10/2013 |
| NZ | 591486 | B | 1/2014 |
| NZ | 592781 | B | 3/2014 |
| PH | 1-2010-501704 | | 2/2014 |
| PH | 1-2010-501705 | | 2/2015 |
| WO | WO-99/17517 | | 4/1999 |
| WO | WO-1999/017517 | A1 | 4/1999 |
| WO | WO-01/63894 | | 8/2001 |
| WO | WO-2001/063894 | A2 | 8/2001 |
| WO | WO-2006/124113 | A2 | 11/2006 |
| WO | WO-2010/053701 | A2 | 5/2010 |
| WO | WO-2011/081514 | | 7/2011 |
| WO | WO-2011/081514 | A1 | 7/2011 |

OTHER PUBLICATIONS

Canadian Office Action issued in Canadian Patent Application No. 2713526, dated Oct. 25, 2016, 7 pages.

Cleveland, William S., "Robust Locally Weighted Regression and Smoothing Scatterplots," Journal of the American Statistical Association, vol. 74, No. 368, pp. 829-836 (Dec. 1979).

(56) References Cited

OTHER PUBLICATIONS

Gans, N. et al. (2003), "Telephone Call Centers: Tutorial, Review and Research Prospects," Manufacturing & Service Operations Management, vol. 5, No. 2, pp. 79-141.
International Preliminary Report on Patentability issued in connection with PCT Application No. PCT/US2009/066254 dated Jun. 14, 2011 (6 pages).
International Search Report issued in connection with International Application No. PCT/US13/33268 dated May 31, 2013 (2 pages).
International Search Report issued in connection with PCT Application No. PCT/US/2009/054352 dated Mar. 12, 2010, 5 pages.
International Search Report issued in connection with PCT Application No. PCT/US2008/077042 dated Mar. 13, 2009 (3 pages).
International Search Report issued in connection with PCT Application No. PCT/US2009/031611 dated Jun. 3, 2009 (5 pages).
International Search Report issued in connection with PCT Application No. PCT/US2009/066254 dated Feb. 24, 2010 (4 pages).
International Search Report issued in connection with PCT/US2009/061537 dated Jun. 7, 2010 (5 pages).
International Search Report issued in connection with PCT/US2013/033261 dated Jun. 14, 2013 (3 pages).
International Search Report issued in connection with PCT/US2013/33265 dated Jul. 9, 2013 (2 pages).
International Search Report and Written Opinion issued by the European Patent Office as International Searching Authority for International Application No. PCT/IB2016/001762 dated Feb. 20, 2017 (15 pages).
Japanese Office Action issued by the Japan Patent Office for Application No. 2015-503396 dated Jun. 29, 2016 (7 pages).
Koole, G. (2004). "Performance Analysis and Optimization in Customer Contact Centers," Proceedings of the Quantitative Evaluation of Systems, First International Conference, Sep. 27-30, 2004 (4 pages).
Ntzoufras, "Bayesian Modeling Using Winbugs". Wiley Interscience, Chapter 5, Normal Regression Models, Oct. 18, 2007, pp. 155-220 (67 pages).
Press, W. H. and Rybicki, G. B., "Fast Algorithm for Spectral Analysis of Unevenly Sampled Data," The Astrophysical Journal, vol. 338, pp. 277-280 (Mar. 1, 1989).
Subsequent Substantive Examination Report issued in connection with Philippines Application No. 1-2010-501705 dated Jul. 14, 2014 (1 pages).
Substantive Examination Report issued in connection with Philippines Application No. 1/2011/500868 dated May 2, 2014 (1 page).
Written Opinion of the International Searching Authority issued in connection with PCT Application No. PCT/US2008/077042 dated Mar. 13, 2009, 6 pages.
Written Opinion of the International Searching Authority issued in connection with International Application No. PCT/US13/33268 dated May 31, 2013, 7 pages.
Written Opinion of the International Searching Authority issued in connection with PCT Application No. PCT/US/2009/054352 dated Mar. 12, 2010, 5 pages.
Written Opinion of the International Searching Authority issued in connection with PCT Application No. PCT/US2009/031611 dated Jun. 3, 2009, 7 pages.
Written Opinion of the International Searching Authority issued in connection with PCT Application No. PCT/US2009/066254 dated Feb. 4, 2010, 5 pages.
Written Opinion of the International Searching Authority issued in connection with PCT/US2009/061537 dated Jun. 7, 2010, 10 pages.
Written Opinion of the International Searching Authority issued in connection with PCT/US2013/033261 dated Jun. 14, 2013, 7 pages.
Written Opinion of the International Searching Authority issued in connection with PCT/US2013/33265 dated Jul. 9, 2013, 7 pages.
U.S. Appl. No. 12/843,807, filed Mar. 15, 2013, S. James P. Spottiswoode et al.
U.S. Appl. No. 13/221,692, filed Aug. 30, 2011, Spottiswoode et al.
U.S. Appl. No. 13/715,765, filed Dec. 14, 2012, Zia Chishti et al.
U.S. Appl. No. 13/843,541, filed Mar. 15, 2013, Zia Chisti et al.
U.S. Appl. No. 13/843,724, filed Mar. 15, 2013, Spottiswoode et al.
U.S. Appl. No. 13/843,807, filed Mar. 15, 2013, Spottiswoode et al.
U.S. Appl. No. 13/854,825, filed Apr. 1, 2013, Zia Chisti et al.
Anonymous. (2006). "Performance Based Routing in Profit Call Centers," The Decision Makers' Direct, located at www.decisioncraft.com, Issue Dec. 6, 2001, three pages.
Gans, N. et al. (2003). "Telephone Call Centers: Tutorial, Review and Research Prospects," Manuscript, pp. 1-81.
International Search Report dated Jun. 14, 2013 issued in connection with PCT/US2013/033261.
International Search Report mailed Jul. 6, 2010 issued in connection with PCT/US2009/061537.
International Search Report mailed Jul. 9, 2013 issued in connection with PCT/US2013/33265.
International Search Report mailed on Feb. 24, 2010, for PCT Application No. PCT/US2009/066254, filed on Dec. 1, 2009, 4 pages.
International Search Report mailed on Jun. 3, 2009, for PCT Application No. PCT/US2009/031611, filed on Jan. 21, 2009, 5 pages.
International Search Report mailed on Mar. 12, 2010, for PCT Application No. PCT/US2009/054352, filed on Aug. 19, 2009, 5 pages.
International Search Report mailed on Mar. 13, 2009, for PCT Application No. PCT/US2008/077042, filed on Sep. 19, 2008, 2 pages.
Koole, G. et al. (Mar. 6, 2006). "An Overview of Routing and Staffing Algorithms in Multi-Skill Customer Contact Centers," Manuscript, 42 pages.
Notice of Allowance dated Jun. 29, 2012 issued in connection with U.S. Appl. No. 12/355,618.
Notice of Allowance dated Sep. 19, 2012 issued in connection with U.S. Appl. No. 12/180,382.
Notice of Allowance dated Oct. 4, 2013 issued in connection with U.S. Appl. No. 12/202,101.
Notice of Allowance dated Feb. 28, 2013 issued in connection with U.S. Appl. No. 12/331,201.
Notice of Allowance dated Apr. 11, 2013 issued in connection with U.S. Appl. No. 12/869,654.
Notice of Allowance dated Sep. 18, 2013 issued in connection with U.S. Appl. No. 12/331,153.
Notice of Allowance dated Sep. 5, 2013 issued in connection with U.S. Appl. No. 12/331,161.
Notice of Allowance dated Apr. 10, 2013 issued in connection with U.S. Appl. No. 12/266,461.
Notice of Allowance mailed Jul. 8, 2013, issued in connection with U.S. Appl. No. 13/843,541.
Notification of Transmittal of the International Search Report and the Written Opinion of the International Searching Authority, or the Declaration mailed Jul. 9, 2013 issued in connection with PCT/US2013/33265.
Office Action dated Jan. 19, 2012 issued in connection with U.S. Appl. No. 12/266,415.
Office Action dated Jan. 23, 2012 issued in connection with U.S. Appl. No. 12/331,186.
Office Action dated Feb. 3, 2012 issued in connection with U.S. Appl. No. 12/202,091.
Office Action dated Feb. 3, 2012 issued in connection with U.S. Appl. No. 12/202,097.
Office Action dated Mar. 1, 2012 issued in connection with U.S. Appl. No. 12/180,382.
Office Action dated Mar. 2, 2012 issued in connection with U.S. Appl. No. 12/267,459.
Office Action dated Mar. 15, 2012 issued in connection with U.S. Appl. No. 12/202,101.
Office Action dated Mar. 19, 2012 issued in connection with U.S. Appl. No. 12/490,949.
Office Action dated Mar. 30, 2012 issued in connection with U.S. Appl. No. 12/267,471.
Office Action dated Apr. 6, 2012 issued in connection with U.S. Appl. No. 12/021,251.
Office Action dated Apr. 16, 2012 issued in connection with U.S. Appl. No. 12/331,210.

(56) References Cited

OTHER PUBLICATIONS

Office Action dated Apr. 18, 2012 issued in connection with U.S. Appl. No. 12/266,418.
Office Action dated May 11, 2012 issued in connection with U.S. Appl. No. 12/266,415.
Office Action dated May 11, 2012 issued in connection with U.S. Appl. No. 12/331,195.
Office Action dated Jun. 7, 2012 issued in connection with U.S. Appl. No. 12/331,181.
Office Action dated Jun. 7, 2012 issued in connection with U.S. Appl. No. 12/355,602.
Office Action dated Jun. 8, 2012 issued in connection with U.S. Appl. No. 12/266,446.
Office Action dated Jun. 18, 2012 issued in connection with U.S. Appl. No. 12/331,201.
Office Action dated Jun. 29, 2012 issued in connection with U.S. Appl. No. 12/331,153.
Office Action dated Aug. 4, 2011 issued in connection with U.S. Appl. No. 12/267,459.
Office Action dated Aug. 9, 2011 issued in connection with U.S. Appl. No. 12/202,101.
Office Action dated Aug. 19, 2011 issued in connection with U.S. Appl. No. 12/202,097.
Office Action dated Aug. 19, 2011 issued in connection with U.S. Appl. No. 12/331,186.
Office Action dated Aug. 23, 2011 issued in connection with U.S. Appl. No. 12/180,382.
Office Action dated Sep. 6, 2011 issued in connection with U.S. Appl. No. 12/202,091.
Office Action dated Sep. 12, 2011 issued in connection with U.S. Appl. No. 12/266,446.
Office Action dated Sep. 13, 2011 issued in connection with U.S. Appl. No. 12/331,181.
Office Action dated Sep. 15, 2011 issued in connection with U.S. Appl. No. 12/266,418.
Office Action dated Sep. 19, 2011 issued in connection with U.S. Appl. No. 12/021,251.
Office Action dated Sep. 23, 2011 issued in connection with U.S. Appl. No. 12/355,602.
Office Action dated Sep. 26, 2011 issued in connection with U.S. Appl. No. 12/331,153.
Office Action dated Sep. 26, 2011 issued in connection with U.S. Appl. No. 12/355,618.
Office Action dated Jan. 15, 2013 issued in connection with U.S. Appl. No. 12/267,471.
Office Action dated Jan. 3, 2013 issued in connection with U.S. Appl. No. 12/331,210.
Office Action dated Jan. 31, 2013 issued in connection with U.S. Appl. No. 12/331,161.
Office Action dated Oct. 7, 2011 issued in connection with U.S. Appl. No. 12/331,195.
Office Action dated Oct. 7, 2011 issued in connection with U.S. Appl. No. 12/331,210.
Office Action dated Oct. 9, 2012 issued in connection with U.S. Appl. No. 12/202,101.
Office Action dated Oct. 11, 2012 issued in connection with U.S. Appl. No. 12/267,459.
Office Action dated Oct. 21, 2013 issued in connection with U.S. Appl. No. 12/331,210.
Office Action dated Oct. 29, 2012 issued in connection with U.S. Appl. No. 12/490,949.
Office Action dated Nov. 1, 2012 issued in connection with Chinese Application No. 200880128336.9, with English translation.
Office Action dated Nov. 1, 2012 issued in connection with Mexican Application No. MX/a/2010/008238.
Office Action dated Nov. 1, 2012 issued in connection with Mexican Application No. MX/a/2011/002272.
Office Action dated Dec. 13, 2012 issued in connection with U.S. Appl. No. 12/355,602.
Office Action dated Dec. 28, 2012 issued in connection with U.S. Appl. No. 12/266,461.
Office Action dated Dec. 31, 2012 issued in connection with U.S. Appl. No. 12/869,645.
Office Action dated Dec. 31, 2012 issued in connection with U.S. Appl. No. 12/869,654.
Office Action dated Feb. 21, 2013 issued in connection with Japanese Patent Application No. 2010-544292.
Office Action dated Mar. 28, 2013 issued in connection with U.S. Appl. No. 13/221,692.
Office Action dated Jun. 27, 2013 issued in connection with U.S. Appl. No. 12/869,645.
Office Action dated Jul. 5, 2013 issued in connection with Mexican Application No. MX/a/2011/002272.
Office Action dated Jul. 9, 2013 issued in connection with Chinese Application No. 200980142771.1, with English translation.
Office Action dated Aug. 13, 2013 issued in connection with U.S. Appl. No. 13/854,825.
Office Action dated Aug. 28, 2013 issued in connection with Chinese Application No. 200980153730.2, with English translation.
Office Action dated Sep. 23, 2013 issued in connection with U.S. Appl. No. 12/331,186.
Office Action dated Sep. 24, 2013 issued in connection with U.S. Appl. No. 12/202,097.
Office Action dated Aug. 31, 2012 issued in connection with Mexican Patent Application No. MX/a/2011/004815.
Office Action dated Jan. 8, 2013 issued in connection with Australian Patent Application No. 2008349500.
Office Action dated Jan. 8, 2013 issued in connection with Australian Patent Application No. 2009209317.
Office Action dated Jul. 30, 2013 issued in connection with U.S. Appl. No. 12/331,181.
Office Action dated Jun. 7, 2013 issued in connection with Japanese Patent Application No. 2010-544399.
Office Action dated Mar. 20, 2013 issued in connection with U.S. Appl. No. 12/331,153.
Office Action dated May 21, 2013 issued in connection with U.S. Appl. No. 12/267,459.
Office Action mailed Apr. 24, 2013 issued in connection with Mexican Patent Application No. MX/a/2011/004815.
Office Action mailed Jul. 2, 2013 in connection with Mexican Application No. MX/a/2010/008238.
Riedmiller, M. et al. (1993). "A Direct Adaptive Method for Faster BackpropagationLearning: The RPROP Algorithm," 1993 IEEE International Conference on Neural Networks, San Francisco, CA, Mar. 28-Apr. 1, 1993, 1:586-591.
Stanley et al., "Improving call center operations using performance-based routing strategies," Calif. Journal of Operations Management, 6(1), 24-32, Feb. 2008; retrieved from http://userwww.sfsu.edu/saltzman/Publist.html.
Third Office Action dated Aug. 29, 2013 issued in connection with Chinese Application No. 2008801283369.
Written Opinion dated Jun. 14, 2013 issued in connection with PCT/US2013/033261.
Written Opinion dated May 31, 2013 issued in connection with International Application No. PCT/US13/33268.
Written Opinion mailed Jun. 10, 2010 issued in connection with PCT/US2009/061537.
Written Opinion mailed on Feb. 24, 2010, for PCT Application No. PCT/US2009/066254, filed on Dec. 1, 2009, 6 pages.
Written Opinion mailed on Jun. 3, 2009, for PCT Application No. PCT/US2009/031611, filed on Jan. 21, 2009, 8 pages.
Written Opinion mailed on Mar. 12, 2010, for PCT Application No. PCT/US2009/054352, filed on Aug. 19, 2009, 6 pages.
Written Opinion mailed on Mar. 13, 2009, for PCT Application No. PCT/US2008/077042, filed on Sep. 19, 2008, 6 pages.
Written Opinion of the International Searching Authority mailed Jul. 9, 2013 issued in connection with PCT/US2013/33265.
Office Action mailed Oct. 22, 2013 issued in connection with Japanese Application No. 2011-525099.
Mexican Office Action mailed Dec. 17, 2013 issued in connection with Application No. MX/a/2010/008238.

(56) References Cited

OTHER PUBLICATIONS

Notice of Allowance mailed Nov. 18, 2013 issued in connection with U.S. Appl. No. 13/854,825.
Notice of Allowance mailed Dec. 23, 2013 issued in connection with U.S. Appl. No. 12/869,654.
Notice of Allowance mailed Dec. 26, 2013 issued in connection with U.S. Appl. No. 12/869,645.
Notice of Allowance mailed Nov. 26, 2013 issued in connection with U.S. Appl. No. 12/331,181.
Notice of Reasons for Rejection mailed Dec. 20, 2013 issued in connection with Japanese Application No. 2010-544399 with English translation.
Office Action dated Nov. 5, 2013 issued in connection with U.S. Appl. No. 13/715,765.
Office Action dated Dec. 17, 2013 issued in connection with U.S. Appl. No. 12/331,195.
Office Action dated Nov. 6, 2013 issued in connection with U.S. Appl. No. 13/221,692.
Office Action mailed Nov. 5, 2013 issued in connection with U.S. Appl. No. 12/267,471.
Notice of Allowance dated Jan. 30, 2014 issued in connection with U.S. Appl. No. 12/202,091.
Notice of Allowance dated Feb. 27, 2014 issued in connection with U.S. Appl. No. 13/715,765.
Notice of Allowance dated Feb. 3, 2014 issued in connection with U.S. Appl. No. 13/221,692.
Notice of Allowance dated Mar. 27, 2014 issued in connection with U.S. Appl. No. 12/490,949.
Notice of Final Rejection and Denial of Entry of Amendment dated Mar. 31, 2014 issued in connection with Japanese Application No. 2010-544399, with English translation.
Notice of Reasons for Rejection dated Jan. 24, 2014 issued in connection with Japanese Patent Application No. 2011-535592, with English translation.
Office Action dated Jan. 29, 2014 issued in connection with U.S. Appl. No. 14/059,248.
Office action dated Feb. 28, 2014 issued in connection with U.S. Appl. No. 12/266,446.
Office action dated Apr. 9, 2014 issued in connection with Australian application No. 2009288509.

* cited by examiner

USE OF ABSTRACTED DATA IN PATTERN MATCHING SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*Note: More than one reissue patent application has been filed for the reissue of U.S. Pat. No. 8,792,630. The reissue patent applications are U.S. Reissue patent application Ser. No. 15/209,512, filed Jul. 13, 2016, and the present U.S. Reissue patent application Ser. No. 15/216,931, filed Jul. 22, 2016, which is a continuation reissue application of U.S. Reissue patent application Ser. No. 15/209,512, filed Jul. 13, 2016.*

CROSS REFERENCE TO RELATED APPLICATION

This application claims priority from Provisional U.S. Application 61/705,040 filed Sep. 24, 2012, which is incorporated herein by reference in its entirety as if fully set forth herein.

BACKGROUND OF THE INVENTION

The present invention relates to the field of routing phone calls and other telecommunications in a contact center system.

The typical contact center consists of a number of human agents, with each assigned to a telecommunication device, such as a phone or a computer for conducting email or Internet chat sessions, that is connected to a central switch. Using these devices, the agents are generally used to provide sales, customer service, or technical support to the customers or prospective customers of a contact center or a contact center's clients.

Typically, a contact center or client will advertise to its customers, prospective customers, or other third parties a number of different contact numbers or addresses for a particular service, such as for billing questions or for technical support. The customers, prospective customers, or third parties seeking a particular service will then use this contact information, and the incoming caller will be routed at one or more routing points to a human agent at a contact center who can provide the appropriate service. Contact centers that respond to such incoming contacts are referred to as "inbound contact centers."

Similarly, a contact center can make outgoing contacts to current or prospective customers or third parties. Such contacts may be made to encourage sales of a product, provide technical support or billing information, survey consumer preferences, or to assist in collecting debts. Contact centers that make such outgoing contacts are referred to as "outbound contact centers."

In both inbound contact centers and outbound contact centers, the individuals (such as customers, prospective customers, survey participants, or other third parties) that interact with contact center agents over the telephone are referred to in this application as a "caller." The individuals acquired by the contact center to interact with callers are referred to in this application as an "agent."

A typical piece of hardware for any contact center operation is the switch system that connects callers to agents. In an inbound contact center, these switches route incoming callers to a particular agent in a contact center, or, if multiple contact centers are deployed, to a particular contact center for further routing. In an outbound contact center employing telephone devices, dialers are typically employed in addition to a switch system. The dialer is used to automatically dial a phone number from a list of phone numbers, and to determine whether a live caller has been reached from the phone number called (as opposed to obtaining no answer, a busy signal, an error message, or an answering machine). When the dialer obtains a live caller, the switch system routes the caller to a particular agent in the contact center.

Contact routing in an inbound contact center is a process that is generally structured to connect callers to agents that have been idle for the longest period of time. In the case of an inbound caller where only one agent may be available, that agent is generally selected for the caller without further analysis. In another example, if there are eight agents at a contact center, and seven are occupied with contacts, the switch will generally route the inbound caller to the one agent that is available. If all eight agents are occupied with contacts, the switch will typically put the contact on hold and then route it to the next agent that becomes available. More generally, the contact center will set up a queue of incoming callers and preferentially route the longest-waiting callers to the agents that become available over time. Such a pattern of routing contacts to either the first available agent or the longest-waiting agent is referred to as "round-robin" contact routing. In round robin contact routing, eventual matches and connections between a caller and an agent are essentially random.

In an outbound contact center environment using telephone devices, the contact center or its agents are typically provided a "lead list" comprising a list of telephone numbers to be contacted to attempt some solicitation effort, such as attempting to sell a product or conduct a survey. The lead list can be a comprehensive list for all contact centers, one contact center, all agents, or a sub-list for a particular agent or group of agents (in any such case, the list is generally referred to in this application as a "lead list"). After receiving a lead list, a dialer or the agents themselves will typically call through the lead list in numerical order, obtain a live caller, and conduct the solicitation effort. In using this standard process, the eventual matches and connections between a caller and an agent are essentially random.

There is a need for improving on the available mechanisms for matching and connecting a caller to an agent. The present invention accomplishes this.

BRIEF SUMMARY OF THE INVENTION

Embodiments of a method of operating a call center system may comprise: obtaining, by one or more computers, performance data for agents in a set of agents; obtaining, by the one or more computers, a respective abstracted data stream for each of multiple calls, with each respective data stream having multiple different locations along the abstracted data stream representing multiple different respective fields, wherein the meaning for the field data in the respective different locations for the different respective fields is not known by the system; determining, by the one or more computers, from respective field data positions in the respective data streams respective patterns for the respective data streams; obtaining, by the one or more computers, performance data for the respective patterns; and matching, by the one or more computers, using a selected matching algorithm one of the agents from the set of agents to one of the calls based at least in part on the performance data for the respective pattern of the call and based at least in part on the performance data for the respective agents of the set of agents.

In embodiments, the abstracted data stream may be one selected from the group of 0's and 1's, yes and no, true and false, binary, integer, decimal, and alphanumeric.

In embodiments, the abstracted data stream may be scrambled, but the scrambling may be the same for calls received during a period.

In embodiments, the abstracted data stream may be scrambled, and wherein the method may further comprise rearranging, by the one or more computers, the data to an order of a data set to be used to correlation.

In embodiments, the method may further comprise: determining, by the one or more computers, field positions for the fields in the abstracted data stream; and selecting, by the one or more computers, only the determined field positions from the data stream to form the pattern.

In embodiments, for multiple abstracted data streams received during the period, the abstracted data for the different fields may be received in two or more different orders over the course of the period of time, and wherein the method may further comprise arranging, by the one or more computers, the field data for the different fields for the data streams of the respective calls in a same order, by the one or more computers.

In embodiments, the respective pattern determined for the call may be ranked by performance, and wherein the matching algorithm performs matching based at least in part on the performance rank of the call and the performance data of the respective agents in the set of agents.

In embodiments, the performance of the call may be based on one or more selected from the group of sale, call handle time, retention, customer satisfaction, revenue, first call resolution, units sold, and transaction points.

In embodiments, the method may further comprise: obtaining, by the one or more computers, a call type for the respective call selected from the group of sale, complaint, information request, and very important person (VIP), and wherein the matching algorithm performs matching based at least in part on the call type.

In embodiments, the matching step during a period may further comprise: switching, by the one or more computers, to using a different matching algorithm based on correlation of call performance to agent performance at a switchover point in the period.

Embodiments of a system of operating a call center system may comprise: a communications component for handling calls; and one or more computers configured with the following components: a collector configured in the one or more computers to obtain performance data for agents in a set of agents; the collector configured in the one or more computers to obtain a respective abstracted data stream for each of multiple of the calls, with each respective data stream having multiple different locations along the abstracted data stream representing multiple different respective fields, wherein the meaning for the field data in the respective different locations for the different respective fields is not known by the system; the collector configured in the one or more computers to determine from respective field data positions in the respective data streams respective patterns for the respective data streams; the collector configured in the one or more computers to obtain performance data for the respective patterns; and a matching engine configured in the one or more computers with a matching algorithm to match one of the agents from the set of agents to one of the calls based at least in part on the performance data for the respective pattern of the call and based at least in part on the performance data for the respective agents of the set of agents.

In embodiments, the abstracted data stream may be scrambled, and the collector may be configured in the one or more computers to rearrange the data to an order of a data set to be used to correlation.

In embodiments, the collector may configured in the one or more computers to determine field positions for the fields in the abstracted data stream; and to select only the determined field positions from the data stream to form the pattern.

In embodiments, for multiple abstracted data streams received during the period, the abstracted data for the different fields may be received in two or more different orders over the course of the period of time, and the collector may be further configured in the one or more computers to arrange the field data for the different fields for the data streams of the respective calls in a same order.

Embodiments of a program product for operating a call center system may comprise: one or more non-transitory computer-readable media comprising computer-readable program code embodied therein, to perform, when executed by one or more computers, the steps: obtaining, by the one or more computers, performance data for agents in a set of agents; obtaining, by the one or more computers, a respective abstracted data stream for each of multiple calls, with each respective data stream having multiple different locations along the abstracted data stream representing multiple different respective fields, wherein the meaning for the field data in the respective different locations for the different respective fields is not known by the system; determining, by the one or more computers, from respective field data positions in the respective data streams respective patterns for the respective data streams; obtaining, by the one or more computers, performance data for the respective patterns; and matching, by the one or more computers, using a selected matching algorithm one of the agents from the set of agents to one of the calls based at least in part on the performance data for the respective pattern of the call and based at least in part on the performance data for the respective agents of the set of agents.

Many of the techniques described here may be implemented in hardware, firmware, software, or combinations thereof. In one example, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices. Moreover, each program is preferably implemented in a high level procedural or object-oriented programming language to communicate with a computer system. However, the programs can be implemented in assembly or machine language, if desired. In any case, the language may be a compiled or interpreted language.

DETAILED DESCRIPTION OF EMBODIMENTS

Figure 1:
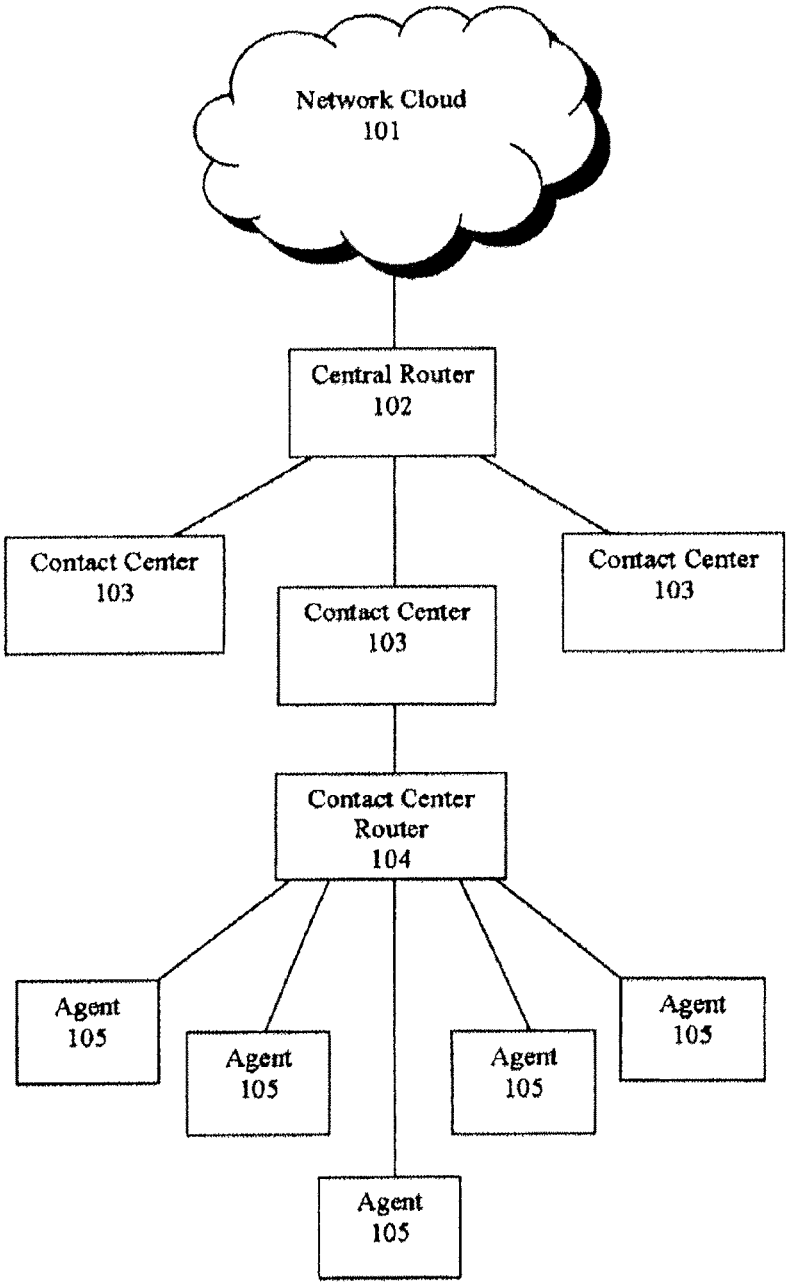
FIG. 1 is a diagram reflecting the general setup of a contact center operation.

The following description is presented to enable a person of ordinary skill in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Exemplary call mapping and routing systems and methods are described, for example, in "Systems and Methods for Routing Callers to an Agent in a Contact Center," filed on Jul. 25, 2008, bearing Ser. No. 12/180,382 (now U.S. Pat. No. 8,359,219); in U.S. patent application Ser. No. 12/267,471, entitled "Routing Callers to Agents Based on Time Effect Data," filed on Nov. 7, 2008; Ser. No. 12/490,949, entitled "Probability Multiplier Process for Call Center Routing," filed on Jun. 24, 2009; and Ser. No. 12/266,418, entitled, "Pooling Callers for Matching to Agents Based on Pattern Matching Algorithms," filed on Nov. 6, 2008, U.S. patent application Ser. No. 12/051,251 filed on Jan. 28, 2008; U.S. patent application Ser. No. 12/267,471 filed on Jan. 28, 2010; provisional application No. 61/084,201 filed Jul. 28, 2008, U.S. patent application Ser. No. 13/843,807 filed on Mar. 15, 2013; U.S. patent application Ser. No. 13/843,541 filed on Mar. 13, 2013; U.S. patent application Ser. No. 13/843,724 filed on Mar. 15, 2013, all of which are incorporated herein by reference in their entirety.

FIG. 1 is a diagram reflecting the general setup of a contact center operation 100. The network cloud 101 reflects a specific or regional telecommunications network designed to receive incoming callers or to support contacts made to outgoing callers. The network cloud 101 can comprise a single contact address, such as a telephone number or email address, or multiple contract addresses. The central router 102 reflects contact routing hardware and software designed to help route contacts among call centers 103. The central router 102 may not be needed where there is only a single contact center deployed. Where multiple contact centers are deployed, more routers may be needed to route contacts to another router for a specific contact center 103. At the contact center level 103, a contact center router 104 will route a contact to an agent 105 with an individual telephone or other telecommunications equipment 105. Typically, there are multiple agents 105 at a contact center 103, though there are certainly embodiments where only one agent 105 is at the contact center 103, in which case a contact center router 104 may prove to be unnecessary.

Figure 2:
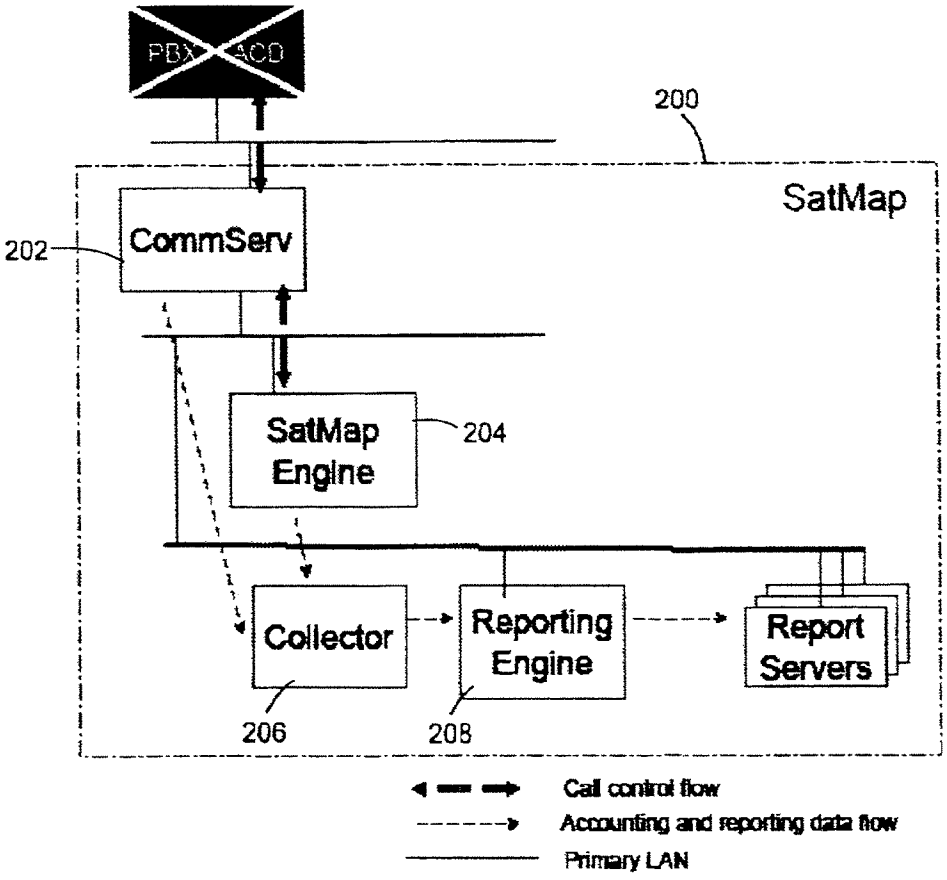
FIG. 2 illustrates an exemplary routing system having a routing engine for routing callers based on performance and/or pattern matching algorithms.

FIG. 2 illustrates an exemplary contact center routing system 200 (which may be included with contact center router 104 of FIG. 1). Broadly speaking, routing system 200 is operable to match callers and agents based, at least in part, on agent performance or pattern matching algorithms using caller data and/or agent data. Routing system 200 may include a communication server 202 and a routing engine 204 (referred to at times as "SatMap" or "Satisfaction Mapping") for receiving and matching callers to agents (referred to at times as "mapping" callers to agents).

Routing engine 204 may operate in various manners to match callers to agents based on performance data of agents, pattern matching algorithms, and computer models, which may adapt over time based on the performance or outcomes of previous caller-agent matches. In one example, the routing engine 204 includes a neural network based adaptive pattern matching engine. Various other exemplary pattern matching and computer model systems and methods which may be included with content routing system and/or routing engine 204 are described, for example, in U.S. patent application Ser. No. 12/021,251, filed Jan. 28, 2008, and U.S. patent application Ser. No. 12/202,091, filed Aug. 29, 2008, both of which are hereby incorporated by reference in their entirety. Of course, it will be recognized that other performance based or pattern matching algorithms and methods may be used alone or in combination with those described here.

Routing system 200 may further include other components such as collector 206 for collecting caller data of incoming callers, data regarding caller-agent pairs, outcomes of caller-agent pairs, agent data of agents, and the like. In embodiments to be described below, the collector may configured in the one or more computers to obtain performance data for agents in a set of agents. In embodiments, the collector may further be configured to obtain a respective abstracted data stream for each of multiple of the calls, with each respective data stream having multiple different locations along the abstracted data stream representing multiple different respective fields, wherein the meaning for the field data in the respective different locations for the different respective fields is not known by the system, and to determine from respective field data positions in the respective data streams respective patterns for the respective data streams.

In embodiments, the collector may further be configured in the one or more computers to obtain performance data for the respective patterns. In yet further embodiments, the collector may be configured to rearrange the data to an order of a data set to be used to correlation where the abstracted data stream is scrambled. In embodiments, the collector may further be configured in the one or more computers to determine field positions for the fields in the abstracted data stream; and to select only the determined field positions from the data stream to form the pattern. In embodiments, for multiple abstracted data streams received during the period, the abstracted data for the different fields may be received in two or more different orders over the course of the period of time, and the collector may be further configured in the one or more computers to arrange the field data for the different fields for the data streams of the respective calls in a same order.

Further, routing system 200 may include a reporting engine 208 for generating reports of performance and operation of routing system 200. Various other servers, components, and functionality are possible for inclusion with routing system 200. Further, although shown as a single hardware device, it will be appreciated that various components may be located remotely from each other (e.g., communication server 202 and routing engine 204 need not be included with a common hardware/server system or included at a common location). Additionally, various other components and functionality may be included with routing system 200, but have been omitted here for clarity.

Figure 3:
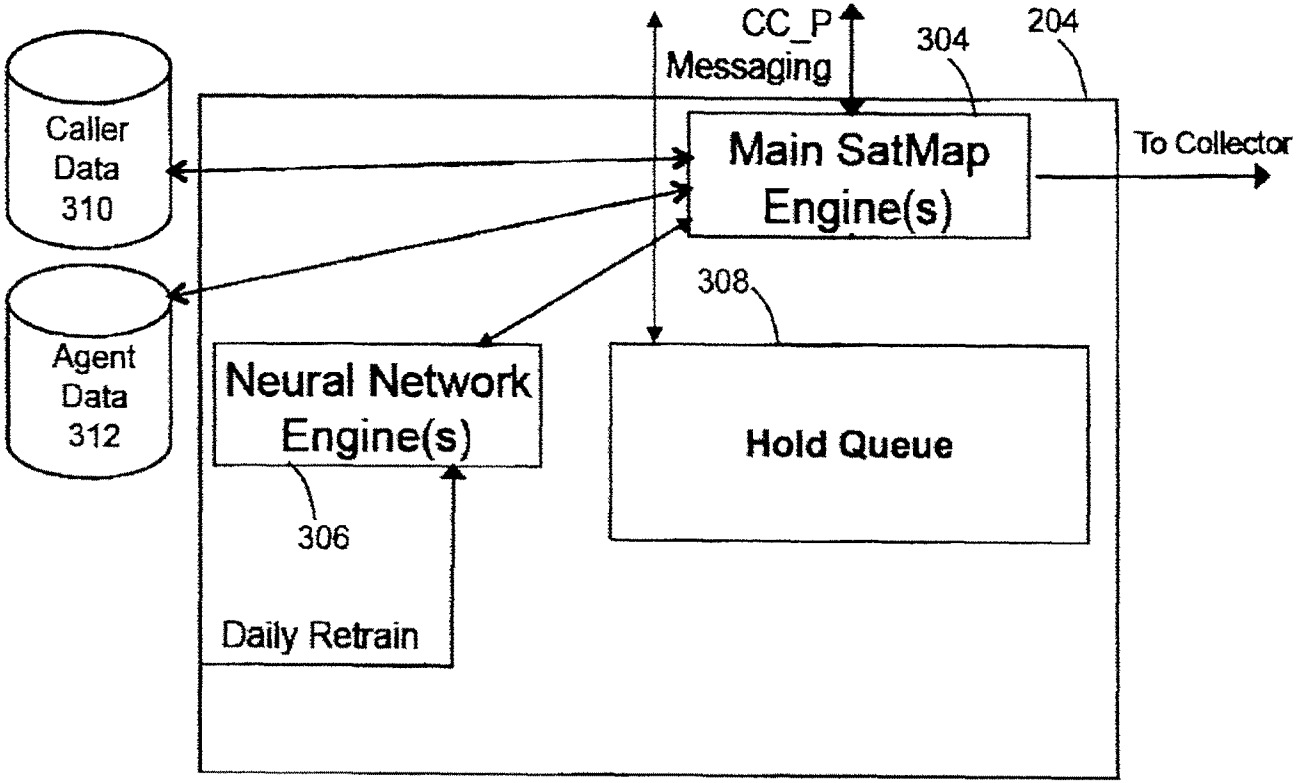
FIG. 3 illustrates an exemplary routing system having a mapping engine for routing callers based on performance and/or pattern matching algorithms.

FIG. 3 illustrates detail of exemplary routing engine 204. Routing engine 204 includes a main mapping engine 304, which receives caller data and agent data from databases 310 and 312. In some examples, routing engine 204 may route callers based solely or in part on performance data associated with agents. In other examples, routing engine 204 may make routing decisions based solely or in part on comparing various caller data and agent data, which may include, e.g., performance based data, demographic data, psychographic data, and other business-relevant data. Additionally, affinity databases (not shown) may be used and such information received by routing engine 204 for making routing decisions.

In one example, routing engine 204 includes or is in communication with one or more neural network engines 306. Neural network engines 306 may receive caller and agent data directly or via routing engine 204 and operate to match and route callers based on pattern matching algorithms and computer models generated to increase the chances of desired outcomes. Further, as indicated in FIG. 3, call history data (including, e.g., caller-agent pair outcomes with respect to cost, revenue, customer satisfaction, etc.) may be used to retrain or modify the neural network engine 306.

Routing engine 204 further includes or is in communication with hold queue 308, which may store or access hold or idle times of callers and agents, and operate to map callers to agents based on queue order of the callers (and/or agents). Mapping engine 304 may operate, for example, to map callers based on a pattern matching algorithm, e.g., as included with neural network engine 306, or based on queue order, e.g., as retrieved from hold queue 308. In particular, mapping engine 304 mapping a first portion of callers based on one or more of performance based data, pattern matching algorithm(s), or computer model(s). Additionally, mapping engine 304 may route a second portion of callers based on a queue order of the callers, preferentially routing those callers that have been held the longest (a similar queue and preferentially routing may be used if multiple agents are available for a caller). It should be noted that other essentially random routing methods may be used in place of queue routing, and which generally serve as a control for comparing with the performance and/or pattern matching mapping methods described.

Figure 4:
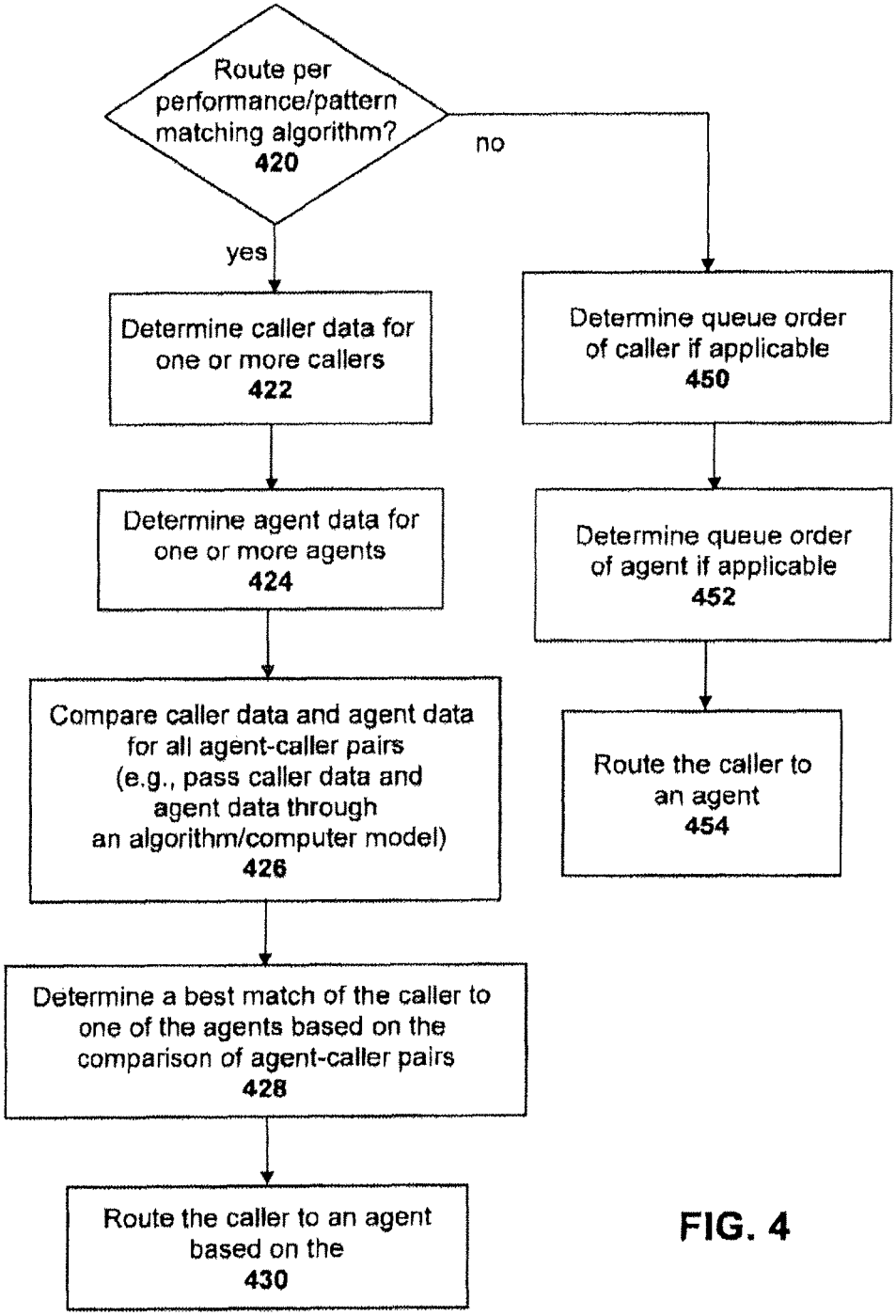
FIG. 4 illustrates an exemplary method for matching a first portion of callers and agents using caller data and agent data in a pattern matching algorithm and a second portion of callers using queue order.

FIG. 4 illustrates an exemplary method for mapping and routing callers to agents where a first portion or fraction of callers is routed based on a performance based and/or pattern matching algorithm and a second portion or fraction of callers is routed based on conventional, essentially random, routing method such as queue based routing. Accordingly, a routing system first determines how the caller is to be routed at 420. For instance, the system may map callers and agents in various ratios depending on the settings input by the contact center. For example, if the setting is at 80, or 80%, the system would map 80% of the caller-agent pairs based on performance and/or pattern matching algorithms and the remaining 20% of caller-agent pairs based on other methods such as queue order.

Exemplary performance based and/or pattern matching methods for routing callers to agents includes rating agents on performance, comparing agent data and caller data and matching per a pattern matching algorithm, creating computer models to predict outcomes of agent-caller pairs, or combinations thereof. In particular, one exemplary method for increasing the chances of an optimal interaction includes combining agent grades (which may be determined from grading or ranking agents on desired outcomes), agent demographic data, agent psychographic data, and other business-relevant data about the agent (individually or collectively referred to in this application as "agent data"), along with demographic, psychographic, and other business-relevant data about callers (individually or collectively referred to in this application as "caller data"). Agent and caller demographic data can comprise any of: gender, age, education, accent, income, wealth, nationality, ethnicity, area code, zip code, marital status, job status, credit score, and the like. Agent and caller psychographic data can comprise any of introversion, sociability, desire for financial success, film and television preferences, and the like.

The exemplary method may include determining caller data associated with one or more callers (e.g., a caller on hold), determining agent data associated with one or more agents (e.g., one or more available agents), comparing the agent data and the caller data (e.g., via a pattern matching algorithm), and matching the caller to an agent to increase the chance of an optimal interaction. In particular, at 422, caller data (such as a caller demographic or psychographic data) is determined or identified for a caller. One way of accomplishing this is by retrieving caller data from available databases by using the caller's contact information as an index. Available databases include, but are not limited to, those that are publicly available, those that are commercially available, or those created by a contact center or a contact center client. In an outbound contact center environment, the caller's contact information is generally known beforehand. In an inbound contact center environment, the caller's contact information can be retrieved by examining the caller's CallerID information or by requesting this information of the caller at the outset of the contact, such as through entry of a caller account number or other caller-identifying information. Other business-relevant data such as historic purchase behavior, current level of satisfaction as a customer, or volunteered level of interest in a product may also be retrieved from available databases.

At 424, agent data for one or more agents is identified or determined. One method of determining agent demographic or psychographic data can involve surveying agents at the time of their employment or periodically throughout their employment. Such a survey process can be manual, such as through a paper or oral survey, or automated with the survey being conducted over a computer system, such as by deployment over a web-browser. In some example, the method uses agent grades, demographic, psychographic, and other business-relevant data, along with caller demographic, psychographic, and other business-relevant data, other embodiments of the exemplary methods and systems can eliminate one or more types or categories of caller or agent data to reduce the time to answer, computing power, or storage necessary.

The agent data and caller data may then be compared at 426. For instance, the agent data and caller data can be passed to a computational system for comparing caller data to agent data for each agent-caller pair, e.g., the caller data and agent data is compared in a pair-wise fashion for each potential routing decision. In one example, the comparison is achieved by passing the agent and caller data to a pattern matching algorithm to create a computer model that matches each caller with each agent and estimates the probable outcome of each matching along a number of optimal interactions, such as the generation of a sale, the duration of contact, or the likelihood of generating an interaction that a customer finds satisfying.

The pattern matching algorithm to be used in the exemplary methods and system can comprise any correlation algorithm, such as a neural network algorithm or a genetic algorithm. To generally train or otherwise refine the algorithm, actual contact results (as measured for an optimal interaction) are compared against the actual agent and caller data for each contact that occurred. The pattern matching algorithm can then learn, or improve its learning of, how matching certain callers with certain agents will change the chance of an optimal interaction. In this manner, the pattern matching algorithm can then be used to predict the chance of an optimal interaction in the context of matching a caller with a particular set of caller data, with an agent of a particular set of agent data. Preferably, the pattern matching algorithm is periodically refined as more actual data on caller interactions becomes available to it, such as periodically training the algorithm every night after a contact center has finished operating for the day.

The pattern matching algorithm may create or use a computer model reflecting the predicted chances of an optimal interaction for each agent and caller matching. Preferably, the computer model will comprise the predicted chances for a set of optimal interactions for every agent that is logged in to the contact center as matched against every available caller. Alternatively, the computer model can comprise subsets of these, or sets containing the aforementioned sets. For example, instead of matching every agent logged into the contact center with every available caller, examples can match every available agent with every available caller, or even a narrower subset of agents or callers. Likewise, the present invention can match every agent that ever worked on a particular campaign—whether available or logged in or not—with every available caller. Similarly, the computer model can comprise predicted chances for one optimal interaction or a number of optimal interactions.

A computer model can also comprise a suitability score for each matching of an agent and a caller. The suitability score can be determined by taking the chances of a set of optimal interactions as predicted by the pattern matching algorithm, and weighting those chances to place more or less emphasis on a particular optimal interaction as related to another optimal interaction. The suitability score can then be used in the exemplary methods and systems to determine which agents should be connected to which callers.

Based on the pattern matching algorithm and/or computer model, the method further includes determining the agent having the best match to the caller at 428. As will be understood, the best matching agent may depend on the pattern matching algorithm, computer model, and desired output variables and weightings selected by a particular call center. The caller is then routed to the best matching agent at 430.

If the caller is selected at 420 for mapping to an agent by a different method (e.g., not based on a performance and/or pattern matching algorithm), this particular exemplary method includes routing via an Automatic Call Distribution (ACD) queue order or the like by determining a queue order of the caller, if applicable, at 450. For example, if other callers are on hold waiting for an available agent, the caller may be queued with other callers, e.g., a system may order the callers in terms of hold time and preferentially map those callers that have been holding the longest. Similarly, the exemplary method includes determining a queue order of the agents, if applicable, at 452 (for example, in a situation where multiple agents are available). Accordingly, the system generally operates to map the agent that has been waiting or idle the longest with the caller that has been holding the longest. The caller may then be routed to the agent at 454.

It is noted that in other examples, where callers are matched with at least a pattern matching algorithm (e.g., alone or in combination with performance based ranking of the agents), the different method may include performance based routing. This allows for comparing or benchmarking the pattern matching algorithm against performance based routing.

According to another aspect of the exemplary systems and methods described, a visual computer interface and printable reports may be provided to the contact center or their clients to allow them to, in a real-time or a past performance basis, monitor the statistics of agent to caller matches, measure the optimal interactions that are being achieved versus the interactions predicted by the computer model, as well as any other measurements of real time or past performance using the methods described herein. A visual computer interface for changing the number or portion of callers that are mapped via performance and/or pattern matching algorithms (as well as the weighting on an optimal interaction) can also be provided to the contact center or the contact center client, such that they can, as discussed herein, monitor the effect of the performance based data and/or pattern matching algorithms on one or more outcome variables.

Figure 5:
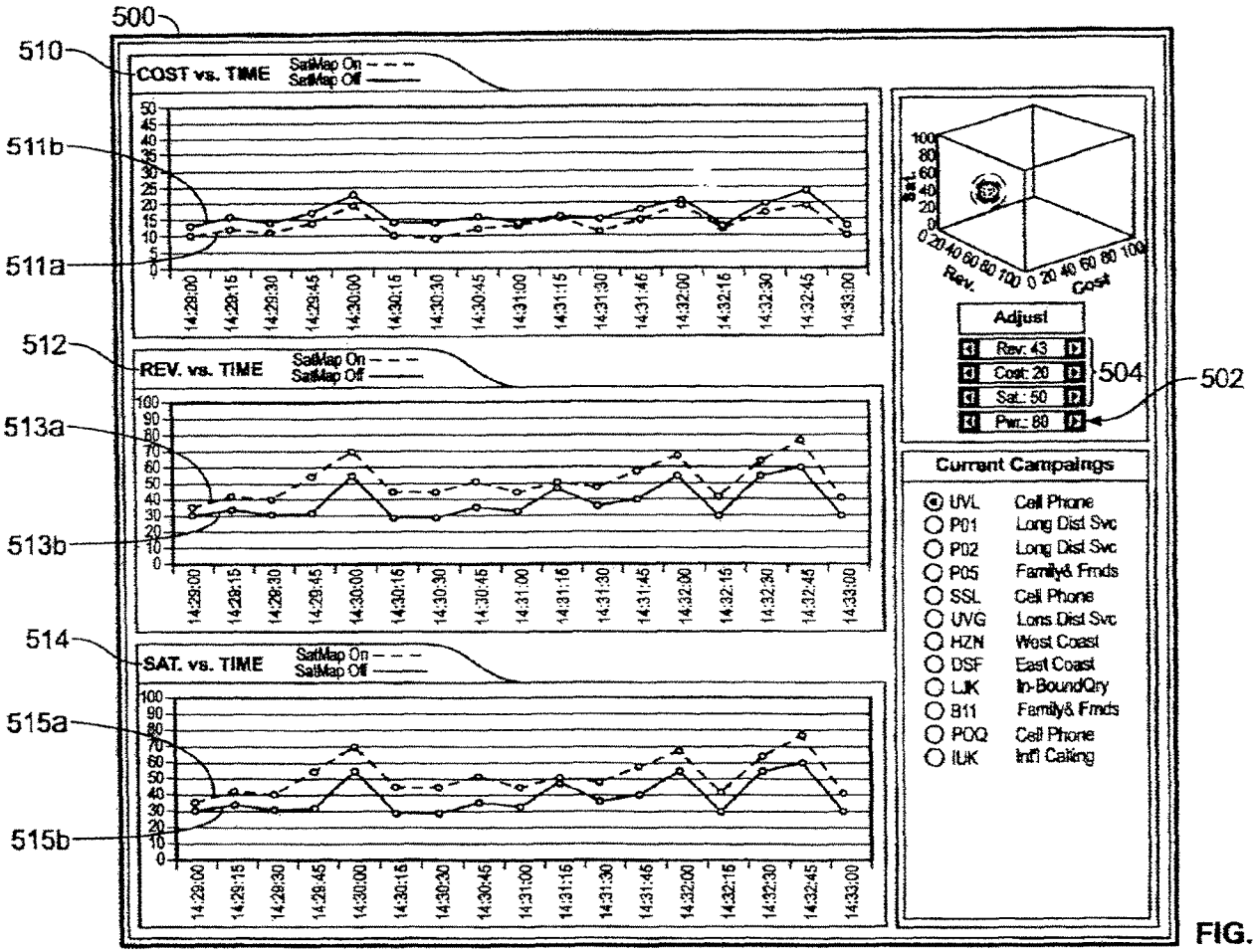
FIG. 5 illustrates an exemplary interface having a graphic element for adjusting the number or fraction of callers for routing based on performance and/or pattern matching algorithms.

FIG. 5 illustrates an exemplary interface 500 having a graphic element 502 for adjusting the fraction or portion of callers that are mapped according to performance and/or pattern matching algorithms. It will be recognized that interface 500 may be displayed within a browser page, portal page, or standalone user interface for a contact center routing system. Additionally, various other information and functionality may be included with interface 500, but is omitted here for clarity.

In this example, interface 500 displays a report of call center performance broken down by different output variables at 510, 512, and 514. In particular, cost, revenue generation, and customer satisfaction are illustrated, but other output variables such as first call resolution, cancellation, or other variable outputs from the pattern matching algorithm(s) or computer model(s) of the system may be displayed. Interface 500 further includes settings for desired weightings of different outcome variables of the pattern matching algorithms and computer models being used for routing callers to agents at 504. In particular, selector 504 includes selectors for adjusting the weighting of revenue, cost, and customer satisfaction in the call center routing algorithms and computer models. Various weighting methods and algorithms are described, for example, in copending U.S. patent application Ser. No. 12/202,091, filed Aug. 29, 2008, which is incorporated herein by reference in its entirety. Of course, various other pattern matching algorithms, computer models, and weighting methods for adjusting the desired outcomes are possible and contemplated.

Selector 502 operates to adjust the "power" of the mapping system, e.g., the portion or percentage of callers that are mapped via performance and/or pattern matching algorithms as described. In this example, if selector 502 is set to "100" the system routes all callers via the performance and/or pattern matching algorithms; alternatively, if selector 502 is set to "0" the system does not route any callers via the performance and/or pattern matching algorithms. Selector 502 may be adjusted in response to input from a mouse, input to a key board (e.g., arrow keys, numerical entries, and so on), or the like. Further, selector 502 may be replaced or further include a "slider" element, drop-down selector, entry field for manually entering numbers or values, up-and-down arrows, and so on.

As described, routing a fraction of callers by an essentially random process provides an evaluation of the performance and/or pattern matching algorithms of the mapping system. For example, outcome variables can be compared for callers routed via the mapping system and those routed otherwise. For instance, interface 500 includes a display 510 of cost over time for the routing system with the mapping system on and off (i.e., "SatMap On" and "SatMap Off") as indicated by 511a and 511b respectively. Display 510 illustrates that the cost is lower for callers routed via the mapping system than those mapped differently (e.g., by queue order or essentially randomly). As indicated in display 512, revenue for callers routed via the mapping system, shown by 513a, is greater than for other callers, shown by 513b. Further, as indicated in display 514, customer satisfaction for callers routed via the mapping system, shown by 515a, is greater than for other callers, shown by 515b. Note that in embodiments, the matching via the pattern matching algorithm may result in frequently reducing the length of time of the calls.

It is noted that the information displayed by displays 510, 512, and 514 are of past performance data; however, in other examples, interface 500 may further operate to display estimated effects on one or more outcome variables by changing selector 502. For instance, displaying the probable change in one or more of cost, revenue generation, or customer satisfaction by changing selector 502. Various estimation methods and algorithms for estimating outcome variables are described, for example, in co-pending U.S. provisional Patent application Ser. No. 61/084,201, filed on Jul. 28, 2008, and which is incorporated herein by reference in its entirety. In one example, the estimate includes evaluating a past time period of the same (or similar) set of agents and constructing a distribution of agent/caller pairs. Using each pair, an expected success rate can be computed via the pattern matching algorithm and applied to current information to estimate current performance (e.g., with respect to one or more of sales, cost, customer satisfaction, etc.). Accordingly, taking historical call data and agent information the algorithm can compute estimates of changing the power or number of callers mapped via the performance and/or pattern matching algorithms. It is noted that a comparable time (e.g., time of day, day of the week etc.) for the historical information may be important as performance will likely vary with time.

As noted, systems and methods of the present invention can be used to optimize the routing of callers to agents in a contact center. Examples of typical optimal interactions include increasing sales, decreasing the duration of the contact (and hence the cost to the contact center), providing for an acceptable level of customer satisfaction, or any other interaction that a contact center may seek to control or optimize.) The systems and methods of the present invention can improve the chance of an optimal interaction by, in general, grading agents on an optimal interaction, and matching a graded agent with a caller to increase the chance of the optimal interaction. In a more advanced embodiment, the systems and methods of the present invention can also be used to increase the chance of an optimal interaction by matching a caller to an agent using a computer model derived from data describing demographic, psychographic, past purchase behavior, or other business-relevant information about a caller, together with data describing demographic, psychographic, or historical performance about an agent.

As noted, in a relatively basic embodiment of the present invention, the performance of a contact center's agents may be collated over a period time to grade each agent on their ability to achieve an optimal interaction. The period of time can be as short as the immediately prior contact to a period extending as long as the agent's first interaction with a caller. The grade determined for the each agent is then used as a factor in matching and connecting a caller to a particular agent. For example, certain agents may be shown to have a greater ability to generate sales than that of other agents engaged in the same contact center. The present invention, by preferentially routing callers to those agents shown to have greater ability to generate sales, can increase the chances of achieving greater sales during the contacts. Similarly, other agents may be shown to generate shorter interactions with callers than that of other agents at the same contact center. By preferentially routing contacts to the agents shown to generate shorter interactions with callers, a contact center or contact center client can decrease its overall need for agents and communication bandwidth, and therefore, reduce its costs.

In general, by grading the agents at a contact center on their ability to achieve an optimal interaction, the contact center can match and connect callers to agents to increase the chance of achieving any optimal interaction that may be chosen. The method of grading agent can be as simple as ranking each agent on a scale of I to N for a particular optimal interaction, with N being the total number of agents. The method of grading can also comprise determining the average contact handle time of each agent to grade the agents on cost, determining the total sales revenue or number of sales generated by each agent to grade the agents on sales, or conducting customer surveys at the end of contacts with callers to grade the agents on customer satisfaction. The foregoing, however, are only examples of how agents may be graded; many other methods exist.

If agents are graded on more than one optimal interaction, the present invention can be configured to weight optimal interactions to ascertain which callers should be routed to which agent. For example, if there were two currently available agents for an individual caller, and the present invention estimated that routing the caller to one agent would result in a higher likelihood of a sale occurring, while routing the caller to the other agent would result in a shorter duration contact, depending on which optimal interaction the present invention was weighting more heavily, the caller may be routed to either the first or the second agent. In another example, if the present invention estimated that routing the caller to one agent would result in a high likelihood of a sale, a short contact duration, but a low level of customer satisfaction, while routing the caller to another agent would result in a high likelihood of a sale, a longer contact duration, but a higher level of customer satisfaction, depending on which mix of optimal interactions the present invention was weighting more heavily, the caller may be routed to the first or second agent.

The weightings placed on the various optimal interactions can take place in real-time in a manner controlled by the contact center, its clients, or in line with predetermined rules. Optionally, the contact center or its clients may control the weighting over the internet or some another data transfer system. As an example, a client of the contact center could access the weightings currently in use over an internet browser and modify these remotely. Such a modification may be set to take immediate effect and, immediately after such a modification, subsequent caller routings occur in line with the newly establishing weightings. An instance of such an example may arise in a case where a contact center client decides that the most important strategic priority in their business at present is the maximization of revenues. In such a case, the client would remotely set the weightings to favor the selection of agents that would generate the greatest probability of a sale in a given contact. Subsequently the client may take the view that maximization of customer satisfaction is more important for their business. In this event, they can remotely set the weightings of the present invention such that callers are routed to agents most likely to maximize their level of satisfaction. Alternatively the change in weighting may be set to take effect at a subsequent time, for instance, commencing the following morning.

In an outbound contact center environment employing telephone devices, the matching that takes place can be reflected in the form of a lead list. The lead list can be for one particular agent or a group of agents, who can then call through the lead list to conduct their solicitation efforts. Where a dialer is used to call through a lead list, upon obtaining, a live caller, the present invention can determine the available agents, match the live caller with one or more of the available agents, and connect the caller with one of those agents. Preferably, the present invention will match the live caller with a group of agents, define an ordering of agent suitability for the caller, match the live caller to the highest-graded agent currently available in that ordering, and connect the caller to the highest-graded agent. In this manner, use of a dialer becomes more efficient in the present invention, as the dialer should be able to continuously call through a lead list and obtain live callers as quickly as possible, which the present invention can then match and connect to the highest graded agent currently available.

In a more advanced embodiment, the system and methods of the present invention can be used to increase the chances of an optimal interaction by combining agent grades, agent demographic data, agent psychographic data, and other business-relevant data about the agent (individually or collectively referred to in this application as "agent data"), along with demographic, psychographic, and other business-relevant data about callers (individually or collectively referred to in this application as "caller data"). Agent and caller demographic data can comprise any of: gender, age, education, accent, income, wealth, nationality, ethnicity, area code, zip code, marital status, job status, and credit score. Agent and caller psychographic data can comprise any of introversion, sociability, desire for financial success, and film and television preferences.

Once agent data and caller data have been collected, this data is passed to a computational system. The computational system then, in turn, uses this data in a pattern matching algorithm to create a computer model that matches each agent with each caller and estimates the probable outcome of each matching along a number of optimal interactions, such as the generation of a sale, the duration of contact, or the likelihood of generating an interaction that a customer finds satisfying. As an example, the present invention may indicate that, by matching a caller to a female agent, the matching will increase the probability of a sale by 4 percent, reduce the duration of a contact by 6 percent, and increase the satisfaction of the caller with the interaction by 12 percent. Generally, the present invention will generate more complex predictions spanning multiple demographic and psychographic aspects of agents and callers. The present invention might conclude, for instance, that a caller if connected to a single, white, male, 25 year old, agent that has high speed internet in his home and enjoys comedic films will result in a 12 percent increase in the probability of a sale, a 7 percent increase in the duration of the contact, and a 2 percent decrease in the caller's satisfaction with the contact. In parallel, the present invention may also determine that the caller if connected to a married, black, female, 55 year old agent will result in a 4 percent increase in the probability of a sale, a 6 percent decrease in the duration of a contact, and a 9 percent increase in the caller's satisfaction with the contact.

It may be that the computer model indicates that a caller match with agent one will result in a high chance of a sale with but a high chance of a long contact, while a caller match with agent two will result in a low chance of a sale but a high chance of a short contact. If an optimal interaction for a sale is more heavily weighted than an optimal interaction of low cost, then the suitability scores for agent one as compared to agent two will indicate that the caller should be connected to agent one. If, on the other hand, an optimal interaction for a sale is less weighted than an optimal interaction for a low cost contact, the suitability score for agent two as compared to agent one will indicate that the caller should be connected to agent two.

One aspect of the present invention is that it may develop affinity databases by storing data, the databases comprising data on an individual caller's contact outcomes (referred to in this application as "caller affinity data"), independent of their demographic, psychographic, or other business-relevant information. Such caller affinity data can include the caller's purchase history, contact time history, or customer satisfaction history. These histories can be general, such as the caller's general history for purchasing products, average contact time with an agent, or average customer satisfaction ratings. These histories can also be agent specific, such as the caller's purchase, contact time, or customer satisfaction history when connected to a particular agent.

The caller affinity data can then be used to refine the matches that can be made using the present invention. As an example, a certain caller may be identified by their caller affinity data as one highly likely to make a purchase, because in the last several instances in which the caller was contacted, the caller elected to purchase a product or service. This purchase history can then be used to appropriately refine matches such that the caller is preferentially matched with an agent deemed suitable for the caller to increase the chances of an optimal interaction. Using this embodiment, a contact center could preferentially match the caller with an agent who does not have a high grade for generating revenue or who would not otherwise be an acceptable match, because the chance of a sale is still likely given the caller's past purchase behavior. This strategy for matching would leave available other agents who could have otherwise been occupied with a contact interaction with the caller. Alternatively, the contact center may instead seek to guarantee that the caller is matched with an agent with a high grade for generating revenue, irrespective of what the matches generated using caller data and agent demographic or psychographic data may indicate.

A more advanced affinity database developed by the present invention is one in which a caller's contact outcomes are tracked across the various agent data. Such an analysis might indicate, for example, that the caller is most likely to be satisfied with a contact if they are matched to an agent of similar gender, age, or other characteristic. Using this embodiment, the present invention could preferentially match a caller with a specific agent or type of agent that is known from the caller affinity data to have generated an acceptable optimal interaction.

Affinity databases can provide particularly actionable information about a caller when commercial, client or publicly-available database sources may lack information about the caller. This database development can also be used to further enhance contact routing and agent-to-caller matching even in the event that there is available data on the caller, as it may drive the conclusion that the individual caller's contact outcomes may vary from what the commercial databases might imply. As an example, if the present invention was to rely solely on commercial databases in order to match a caller and agent, it may predict that the caller would be best matched to an agent of the same gender to achieve optimal customer satisfaction. However, by including affinity database information developed from prior interactions with the caller, the present invention might more accurately predict that the caller would be best matched to an agent of the opposite gender to achieve optimal customer satisfaction.

Another aspect of the present invention is that it may develop affinity databases that comprise revenue generation, cost, and customer satisfaction performance data of individual agents as matched with specific caller demographic, psychographic, or other business-relevant characteristics (referred to in this application as "agent affinity data"). An affinity database such as this may, for example, result in the present invention predicting that a specific agent performs best in interactions with callers of a similar age, and less well in interactions with a caller of a significantly older or younger age. Similarly this type of affinity database may result in the present invention predicting that an agent with certain agent affinity data handles callers originating from a particular geography much better than the agent handles callers from other geographies. As another example, the present invention may predict that a particular agent performs well in circumstances in which that agent is connected to an irate caller.

Though affinity databases are preferably used in combination with agent data and caller data that pass through a pattern matching algorithm to generate matches, information stored in affinity databases can also be used independently of agent data and caller data such that the affinity information is the only information used to generate matches.

The present invention can also comprise connection rules to define when or how to connect agents that are matched to a caller. The connection rules can be as simple as instructing the present invention to connect a caller according to the best match among all available agents with that particular caller. In this manner, caller hold time can be minimized. The connection rules can also be more involved, such as instructing the present invention to connect a caller only when a minimum threshold match exists between an available agent and a caller, or to allow a defined period of time to search for a minimum matching or the best available matching at that time. The connection rules can also purposefully keep certain agents available while a search takes place for a potentially better match.

It is typical for a queue of callers on hold to form at a contact center. When a queue has formed it is desirable to minimize the hold time of each caller in order to increase the chances of obtaining customer satisfaction and decreasing the cost of the contact, which cost can be, not only a function of the contact duration, but also a function of the chance that a caller will drop the contact if the wait is too long. After matching the caller with agents, the connection rules can thus be configured to comprise an algorithm for queue jumping, whereby a favorable match of a caller on hold and an available agent will result in that caller "jumping" the queue by increasing the caller's connection priority so that the caller is passed to that agent first ahead of others in the chronologically listed queue. The queue jumping algorithm can be further configured to automatically implement a trade-off between the cost associated with keeping callers on hold against the benefit in terms of the chance of an optimal interaction taking place if the caller is jumped up the queue, and jumping callers up the queue to increase the overall chance of an optimal interaction taking place over time at an acceptable or minimum level of cost or chance of customer satisfaction. Callers can also be jumped up a queue if an affinity database indicates that an optimal interaction is particularly likely if the caller is matched with a specific agent that is already available.

Ideally, the connection rules should be configured to avoid situations where matches between a caller in a queue and all logged-in agents are likely to result in a small chance of a sale, but the cost of the contact is long and the chances of customer satisfaction slim because the caller is kept on hold for a long time while the present invention waits for the most optimal agent to become available. By identifying such a caller and jumping the caller up the queue, the contact center can avoid the situation where the overall chances of an optimal interaction (e.g., a sale) are small, but the monetary and satisfaction cost of the contact is high.

The present invention may store data specific to each routed caller for subsequent analysis. For example, the present invention can store data generated in any computer model, including the chances for an optimal interaction as predicted by the computer model, such as the chances of sales, contact durations, customer satisfaction, or other parameters. Such a store may include actual data for the caller connection that was made, including the agent and caller data, whether a sale occurred, the duration of the contact, and the level of customer satisfaction. Such a store may also include actual data for the agent to caller matches that were made, as well as how, which, and when matches were considered pursuant to connection rules and prior to connection to a particular agent.

This stored information may be analyzed in several ways. One possible way is to analyze the cumulative effect of the present invention on an optimal interaction over different intervals of time and report that effect to the contact center or the contact center client. For example, the present invention can report back as to the cumulative impact of the present invention in enhancing revenues, reducing costs, increasing customer satisfaction, over five minute, one hour, one month, one year, and other time intervals, such as since the beginning of a particular client solicitation campaign. Similarly, the present invention can analyze the cumulative effect of the present invention in enhancing revenue, reducing costs, and increasing satisfaction over a specified number of callers, for instance 10 callers, 100 callers, 1000 callers, the total number of callers processed, or other total numbers of callers.

One method for reporting the cumulative effect of employing the present invention comprises matching a caller with each agent logged in at the contact center, averaging the chances of an optimal interaction over each agent, determining which agent was connected to the caller, dividing the chance of an optimal interaction for the connected agent by the average chance, and generating a report of the result. In this manner, the effect of the present invention can be reported as the predicted increase associated with routing a caller to a specific agent as opposed to randomly routing the caller to any logged-in agent. This reporting method can also be modified to compare the optimal interaction chance of a specific agent routing against the chances of an optimal interaction as averaged over all available agents or over all logged-in agents since the commencement of a particular campaign. In fact, by dividing the average chance of an optimal interaction over all unavailable agents at a specific period of time by the average chance of an optimal interaction over all available agents at that same time, a report can be generated that indicates the overall boost created by the present invention to the chance of an optimal interaction at that time. Alternatively, the present invention can be monitored, and reports generated, by cycling the present invention on and off for a single agent or group of agents over a period of time, and measuring the actual contact results. In this manner, it can be determined what the actual, measured benefits are created by employing the present invention.

As noted, embodiments of the present invention can include a visual computer interface and printable reports provided to the contact center or their clients to allow them to, in a real-time or a past performance basis, monitor the statistics of agent to caller matches, measure the optimal interactions that are being achieved versus the interactions predicted by the computer model, as well as any other measurements of real time or past performance using the methods described herein. A visual computer interface for changing the weighting on an optimal interaction can also be provided to the contact center or the contact center client, such that they can, as discussed herein, monitor or change the weightings in real time or at a predetermined time in the future.

According to one aspect of the present invention, data may be received or obtained for a call (e.g., from a user or third party or from the present system or a 3$^{rd}$ party database) in an abstracted form. For example, the data may be modified, altered, or otherwise abstracted so as to protect the data contents from identification by the receiving party. In embodiments, the data abstraction process may be performed by the present system and may comprise converting the data into a string of 0's and 1's (or some other binary scheme such as yes/no, true/false), binary, integer, decimal, and numeric, to name a few, for one or more fields. The abstracted data may be used by a pattern matching algorithm to determine correlations amongst the data within a received data set or relative to another data set. The correlations may then be used to match entities without direct knowledge of the data set contents or meaning. In embodiments, there is no specific level of correlation required. In embodiments, intelligent routing is able to exploit relatively small correlations. The system can find and exploit call patterns that have differing responses to agents or properties relating to metrics being optimized without an understanding of what the call pattern actually is, e.g., the field represented in the call pattern—it can just be an abstract string of 0's and 1's.

As noted, to facilitate call and agent matching, one or more databases may be maintained and/or accessed. These databases may comprise data on customers, such as customer demographics and prior call history and results of the respective calls, as well as agent data comprising agent demographics and personality data and results obtained from agent call handling activity. When a call is made or received, the system may automatically or by operator control, access the data in the one or more databases on the caller and a set of agents. The set of agents may be all agents for the call center, or all agents currently available and/or soon to be available.

Pattern matching algorithms and other Artificial Intelligent methods and systems may be used with the present invention. It is understood that a call routing center is described for illustrative purposes only. The present invention may also be used with other systems, e.g., web-based interactive marketing, direct mailings, advertising, and other marketing methods or systems.

In one example, the present invention may be used in a call routing system and method for matching and routing callers to agents based on performance to increase a probability of one or more desired outcomes. In embodiments, an exemplary system and method may operate to determine correlations between caller data and agent data, where the data confidentiality of the caller data and/or the agent data is desirably protected. For instance, caller data may be received from a client CRM (customer relationship management) system, which may contains sensitive data that the client cannot or will not release, even in encrypted form. A typical example of sensitive information would be the monthly rate for the customer's various subscriptions. For example, the customer account is billed $85 per month. A typical example of non-sensitive information would be the tenure of the customer. For example the customer account has been active for 27 months. Note that even if only non-sensitive data were being shared, clients may not want to share the complete phone number nor the complete billing address associated with the account. If, for example, the client would share the complete phone number when providing data, the party receiving the data can conduct lookups to tie customer information to a specific identity.

In embodiments, a system and method may receive the data in a form that is abstract or abstracted, and/or scrambled, and/or anonymous, where the receiving party knows nothing about the meaning of the data. In embodiments, this data may be of no use to anyone other than for finding correlations against some other set of data.

In embodiments, the data feed for an abstracted data stream may comprise one or more fields that identify the individual (phone number or address or name) followed by a string of 0's and 1's (or some other binary scheme such as yes/no, true/false), binary, integer, decimal, and alphanumeric, to name a few, for one or more fields.

In one example, the client may maintain one or more scores on its customers that may have three ranges of values—"low", "medium", or "high." In this scheme, there would be three columns, one for each of the three ranges—"low," "medium" and "high." The values may be filled in as follows:

For a "low" customer, the low column contains a 1 and the other two columns contain 0;

For a "medium" customer, the low column contains a 1, the medium column also contains a 1 and the high column contains a 0. (Alternatively, the "medium" customer would have a 0 in the low column, 1 in the medium column, and a 0 in the high column); and For a "high" customer, the low and the medium columns contain a 0, and the high column contains a 1.

In embodiments, the client does not need to indicate or identify what is in each column, i.e., what each column represents. The scheme simply has to be consistent for all records in the dataset. In embodiments, this dataset may comprise calls received over a period of time. Thus, the abstract data stream may comprise a plurality of fields, with each field including numbers or other alphanumeric indicators indicating low, medium or high for the respective field. With this configuration and having unknown data fields for the customer representing: A (male/female), B (age range), C (location area), D (income range), E (revenue), and F (historical length of calls) in the data stream for the call, the data stream may look like:

AAABBBCCCDDDEEEFFF, or 100110100001001100 with AAA representing the positions for values indicating the A field, etc.

In embodiments, the client may scramble the order of the columns in the data stream. Thus, the client may provide a string of 300 zeros or ones in the data stream for the call. The three columns for the data score for a given field described above could be in any position in the data stream. For example, the 0/1 for high could be in position 57, the 0/1 for low could be in position 223, and the 0/1 for medium could be in position 28. But the scrambling needs to be consistent across all records in the dataset so that it can be correlated within the dataset.

In embodiments, a large training data set may be received by a pattern matching system and used to determine correlations of the different anonymous data streams of numbers and or alphanumerics to desired results actually obtained for these particular data streams, e.g., potential for a sale, retention of the caller in a program, call handle time, customer satisfaction, revenue, first call resolution, units sold, and transaction points, to name just a few. For example, it may be determined from the training data that the data stream 100110100100 correlates to low sales potential, while data stream 001110110100 correlates to high sales potential. Correlations may be determined for a plurality of the different numeric and/or alphanumeric combinations in the data streams. But the identification of the set of fields that these data streams represents is not known. Alternatively, in embodiments, the identification of some of the fields may be known and some of the fields will not be known.

In embodiments, with these correlations for the different numeric and/or alphanumeric combinations, the data stream for a given call may be matched to an agent based on the correlations, without the need to access the sensitive data. That is, the party receiving the data may make the correlations based on the abstracted, or abstracted and scrambled data without knowledge of the underlying data. In embodiments, Spearman or Pearson correlation may be used. In embodiments, the matching engine may compute an (Bayesian regression) estimate of the difference in the call pattern performance between the top performing half of agents and the bottom performing half of agents. Thus, the system can find and exploit call patterns that have differing responses to agents or properties relating to metrics being optimized without an understanding of what the call pattern actually is.

In embodiments, one correlation may be between a desired outcome, e.g., a sale or a retention, revenue, first call resolution, units sold, and transaction points, and the performance rating for an agent. Thus, performance data for the respective call patterns is obtained, which may be used for matching to agents.

It may further be desired to correlate the call pattern performance with the performance level for the agents handling calls with that pattern, to determine a call pattern performance sensitivity to agent performance level. For example, if a given call data stream has a desired performance outcome even with low performance rated agents, then it may be desirable to match the call to a low performance rated agent. Alternatively, if the given call data stream only has a desired outcome with a high performance rated agent, then it may be desirable to match the call to a high performance rated agent.

In embodiments, a selected matching algorithm may be used for a portion of a period. The system may switchover to using a different matching algorithm for matching calls and agents at a switchover point or time. The switchover point or time may be determined empirically or based on other parameters.

In embodiments the data streams during the period may either be delivered in the same format each time, or if in different formats, then a reordering of the fields represented in the data stream may be performed to have the same format as a correlation data set. In other words, although the meaning of the abstracted data in the different field is not known by the pattern matching computers, the positions of these fields in the data stream cannot change during the period. Accordingly, if the fields are scrambled in the data streams received over a period of time, the respective data streams must be reordered to a consistent order with the data set used for the correlation, e.g., a predetermined order for the period.

Figure 7:
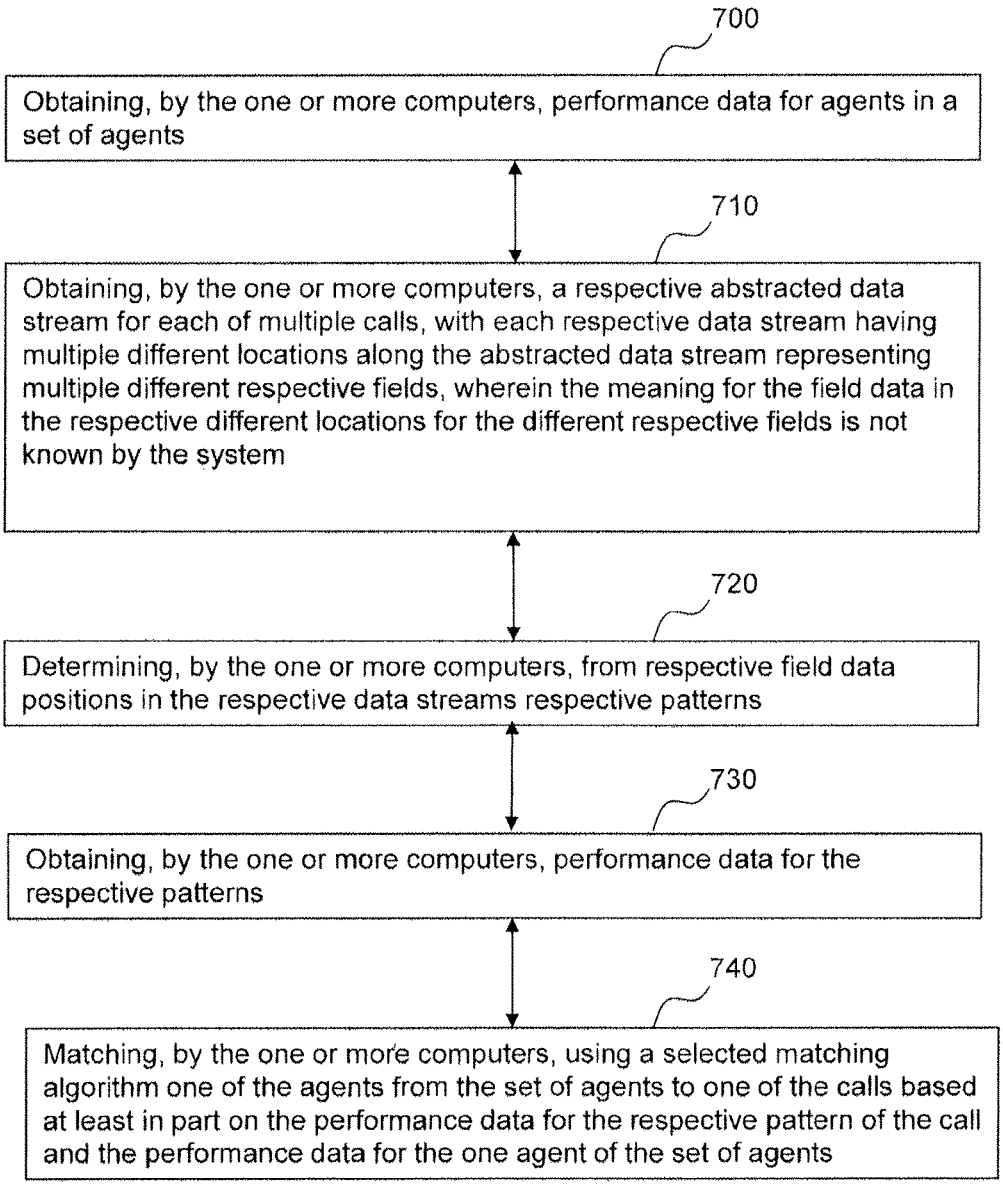
FIG. 7 is a flowchart reflecting an embodiment of the present invention directed to using abstracted pattern data.

Referring to FIG. 7, embodiments of a method of operating a call center is illustrated. Block 700 in the figure represents an operation of obtaining, by one or more computers, performance data and/or other data for agents in a set of agents. In embodiments, the performance can may comprise a rating or a ranking of the agents for one or more of the desired outcomes of potential for a sale, call handle time, retention of a caller in a program, customer satisfaction, revenue, first call resolution, units sold, and transaction points, to name a few. The rating or ranking may be relative to other agents in a set of agents, e.g., in an entire pool of agents, or a set of agents that is currently available or may become available soon. The performance data may be based at least in part on historical performance data for the respective agent, and/or based on an inference from the performance of agents with the same or similar demographic data or personality data. In embodiments, the other agent data may be demographic data for the respective agent, e.g., gender, age range, personality, to name a few.

Block 710 represents an operation of obtaining, by the one or more computers, for each of multiple calls, an abstracted data stream, with multiple different respective locations along the abstracted data stream representing multiple different respective fields, wherein field data in the respective different locations for the different respective fields do not indicate the meaning of the respective fields. In embodiments, the data stream may be a set of 0's and 1's, or yes and no, or true and false, or binary, or integer only, or decimal, or alphanumeric, or alphanumeric. However, in embodiments there may be no indication of what the data fields are, or their positions within the data streams and the system has no information on these data fields. Note that the positions may be dispersed within the data stream for the data fields. In embodiments, some of the data fields may be known, but some of the data fields may not be known.

Block 720 represents an operation of determining, by the one or more computers, from respective field data positions in the data streams respective patterns. In embodiments, all of the field data positions in the data streams may be contiguous. In embodiments, the field data positions may be dispersed within the data streams and must be selected from among other non-pertinent data fields. For this embodiment, it would be necessary to have information on the positions of the field data within the data streams. In embodiments, the field data may be reordered so that all field data columns that pertain to a given field are contiguous.

Block 730 represents an operation of obtaining, by the one or more computers, performance data for the respective patterns. In embodiments, this step may comprise accessing or receiving pattern correlation data for one or more desired outcomes, e.g., potential for a sale, retention of the caller in a program, call handle time, customer satisfaction, revenue, first call resolution, units sold, and transaction points, to name just a few. As noted, this correlation data may be obtained by correlating the different field data patterns in training data to the desired outcome of interest. This correlation may continue to be updated as the system operates and more calls are connected to agents and results of the calls obtained and recorded.

In embodiments, call performance may be determined by performing the correlation operation to correlate data patterns representing data about the caller, e.g., location, gender, age range, income range, to name a few, with historical results obtained from the training data. Accordingly, in embodiments, various patterns of data representing caller information may correlate to high potential for a sale or other desired outcome and may be given a high performance rating or ranking Various other patterns may correlate to a low potential for a sale or other desired outcome, and may be given a lower rating or ranking.

Block 740 represents an operation of matching, by the one or more computers, using a selected matching algorithm one of the agents from the set of agents to one of the calls based at least in part on the performance data for the respective pattern and based at least in part on the performance data for the respective agents of the set of agents. Accordingly, a call with a determined potential for a desired outcome based on the call pattern correlation data, may be matched to an agent selected from the set of agents based at least in part on the agent performance data. In embodiments, the agent performance data may be used in the matching step based in part on the influence the level of agent performance has in obtaining the desired outcome for this particular pattern. As noted, for data patterns where agent performance only minimally correlates with the desired outcome, agents with a low level of agent performance may be selected. Alternatively, for data patterns where agent performance highly correlates with the desired outcome, then an agent with a higher level of agent performance may be selected.

Accordingly, in embodiments the pattern matching algorithm may also use data on a level of influence/correlation between call performance and agent performance, as well as other data. The respective pattern determined for the respective call may be ranked, by the one or more computers, based at least in part on the level of influence/correlation that agent performance or other agent data has been determined to have in the training data on achieving the desired result for the respective call pattern. The pattern matching algorithm may then perform matching based at least in part on the influence ranking for the respective pattern and the performance data and/or other date for the respective agents of the set of agents.

In embodiments, the level of influence/correlation that agent performance has on achieving a desired result for the respective pattern may be determined for each of two or more call types, e.g., sale, complaint, information request, and very important person (VIP), to name a few.

In embodiments, the matching step during a period may further comprise switching, by the one or more computers, to using a different matching algorithm at a switchover point in the period. The switchover pointed may be determined empirically, or by inference from hypothetical performance data, e.g., inferring from the historical performance data what would have happened if two or more algorithms had been in place and been switched.

In embodiments, the pattern matching algorithm may use different agent parameters in the matching algorithm, e.g., one or more elements of the demographic data for the agents and/or psychographic data.

In embodiments, the abstracted data stream may be scrambled, but with the scrambling being the same for calls in the data set to be correlated, e.g., received during a period.

In embodiments, the method may further comprise the steps of determining, by the one or more computers, field positions for the fields in the abstracted data stream; and selecting, by the one or more computers, only the determined field positions from the data stream to form the pattern.

In embodiments, multiple of the abstracted data streams may be received during a period where the abstracted data in the different data streams are received with the fields in two or more different orders. In embodiments, the step may be performed of arranging, by the one or more computers, the field data for the different fields for the data streams of the respective calls in a same order, by the one or more computers.

In embodiments, the respective pattern determined for the call may be ranked by performance, e.g., the potential that a desired outcome (sale, call handle time, retention, customer satisfaction, revenue, first call resolution, units sold, and transaction points, to name a few) will be realized. In such embodiments, the matching algorithm may perform matching based at least in part on the performance rank of the call pattern and the performance data of the respective agents in the set of agents.

Many of the techniques described here may be implemented in hardware or software, or a combination of the two. Preferably, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices. Moreover, each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Figure 6:
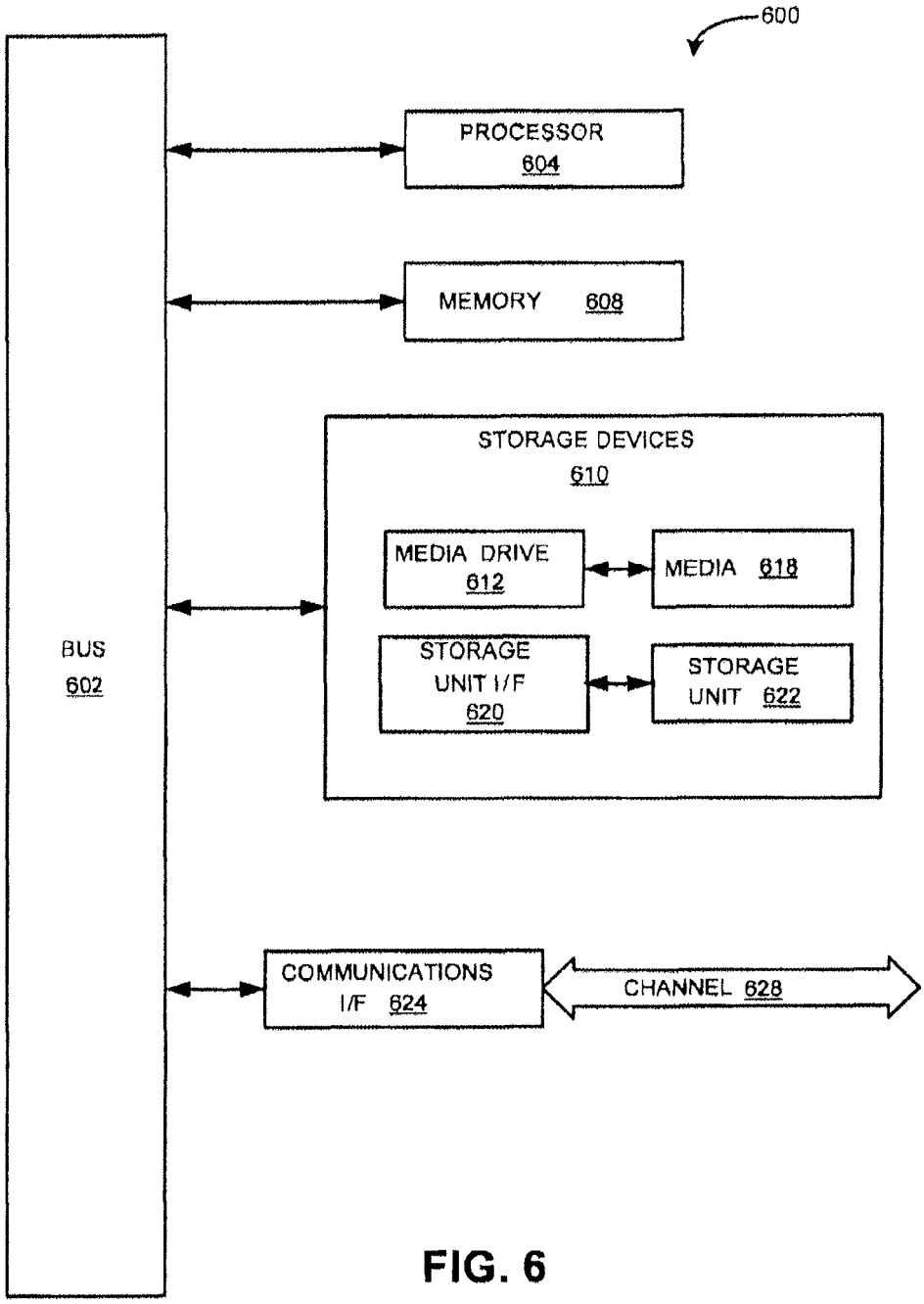
FIG. 6 illustrates a typical computing system that may be employed to implement some or all processing functionality in certain embodiments of the invention.

FIG. 6 illustrates a typical computing system 600 that may be employed to implement processing functionality in embodiments of the invention. Computing systems of this type may be used in clients and servers, for example. Those skilled in the relevant art will also recognize how to implement the invention using other computer systems or architectures. Computing system 600 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 600 can include one or more processors, such as a processor 604. Processor 604 can be implemented using a general or special purpose processing engine such as, for example, a microprocessor, microcontroller or other control logic. In this example, processor 604 is connected to a bus 602 or other communication medium.

Computing system 600 can also include a main memory 608, such as random access memory (RAM) or other dynamic memory, for storing information and instructions to be executed by processor 604. Main memory 608 also may be used for storing temporary variables or other intermediate information during execution of instructions to be executed by processor 604. Computing system 600 may likewise include a read only memory ("ROM") or other static storage device coupled to bus 602 for storing static information and instructions for processor 604.

The computing system 600 may also include information storage system 610, which may include, for example, a media drive 612 and a removable storage interface 620. The media drive 612 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 618 may include, for example, a hard disk, floppy disk, magnetic tape, optical disk, CD or DVD, or other fixed or removable medium that is read by and written to by media drive 612. As these examples illustrate, the storage media 618 may include a computer-readable storage medium having stored therein particular computer software or data.

In alternative embodiments, information storage system 610 may include other similar components for allowing computer programs or other instructions or data to be loaded into computing system 600. Such components may include, for example, a removable storage unit 622 and an interface 620, such as a program cartridge and cartridge interface, a removable memory (for example, a flash memory or other removable memory module) and memory slot, and other removable storage units 622 and interfaces 620 that allow software and data to be transferred from the removable storage unit 618 to computing system 600.

Computing system 600 can also include a communications interface 624. Communications interface 624 can be used to allow software and data to be transferred between computing system 600 and external devices. Examples of communications interface 624 can include a modem, a network interface (such as an Ethernet or other NIC card), a communications port (such as for example, a USB port), a PCMCIA slot and card, etc. Software and data transferred via communications interface 624 are in the form of signals which can be electronic, electromagnetic, optical or other signals capable of being received by communications interface 624. These signals are provided to communications interface 624 via a channel 628. This channel 628 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to physical, tangible media such as, for example, memory 608, storage media 618, or storage unit 622. These and other forms of computer-readable media may be involved in storing one or more instructions for use by processor 604, to cause the processor to perform specified operations. Such instructions, generally referred to as "computer program code" (which may be grouped in the form of computer programs or other groupings), when executed, enable the computing system 600 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 600 using, for example, removable storage media 618, drive 612 or communications interface 624. The control logic (in this example, software instructions or computer program code), when executed by the processor 604, causes the processor 604 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

It should be noted that although the flow charts provided herein show a specific order of method steps, it is understood that the order of these steps may differ from what is depicted.

Also two or more steps may be performed concurrently or with partial concurrence, Such variation will depend on the software and hardware systems chosen and on designer choice. It is understood that all such variations are within the scope of the invention. Likewise, software and web implementations of the present invention could be accomplished with programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations. It should also be noted that the phrase "a plurality" is intended to mean more than one, and is not intended to refer to any previous recitation of the word "plurality," unless preceded by the word "the." When it is stated that one of A and B, it means that one is selected from the group of A and B.

All components, modes of communication, and/or processes described heretofore are interchangeable and combinable with similar components, modes of communication, and/or processes disclosed elsewhere in the specification, unless an express indication is made to the contrary. It is intended that any structure or step of an embodiment disclosed herein may be combined with other structure and or method embodiments disclosed herein to form an embodiment with this added element or step unless a statement herein explicitly prohibits this combination.

The above-described embodiments of the present invention are merely meant to be illustrative and not limiting. Various changes and modifications may be made without departing from the invention in its broader aspects. The appended claims encompass such changes and modifications within the spirit and scope of the invention.

We claim:

[1. A method of operating a call center system, comprising:

obtaining, by one or more computers, performance data for agents in a set of agents;

obtaining, by the one or more computers, a respective abstracted data stream for each of multiple calls, with each respective data stream having multiple different locations along the abstracted data stream representing multiple different respective fields, wherein the meaning for the field data in the respective different locations for the different respective fields is not known by the system;

determining, by the one or more computers, from respective field data positions in the respective data streams respective patterns for the respective data streams;

obtaining, by the one or more computers, performance data for the respective patterns; and matching, by the one or more computers, using a selected matching algorithm one of the agents from the set of agents to one of the calls based at least in part on the performance data for the respective pattern of the call and based at least in part on the performance data for the respective agents of the set of agents.]

[2. The method as defined in claim 1, wherein the abstracted data stream is one selected from the group of 0's and 1's, yes and no, true and false, binary, integer, decimal, and alphanumeric.]

[3. The method as defined in claim 1, wherein the abstracted data stream is scrambled, but the scrambling is the same for calls received during a period.]

[4. The method as defined in claim 1, wherein the abstracted data stream is scrambled, and further comprising:

rearranging, by the one or more computers, the data to an order of a data set to be used for correlation.]

[5. The method as defined in claim 1, further comprising the steps:

determining, by the one or more computers, field positions for the fields in the abstracted data stream; and selecting, by the one or more computers, only the determined field positions from the data stream to form the pattern.]

[6. The method as defined in claim 1, wherein for multiple of the abstracted data streams received during the period, the abstracted data for the different fields are received in two or more different orders over the course of the period of time, and further comprising arranging, by the one or more computers, the field data for the different fields for the data streams of the respective calls in a same order, by the one or more computers.]

[7. The method as defined in claim 1, wherein the respective pattern determined for the call is ranked by performance, and wherein the matching algorithm performs matching based at least in part on the performance rank of the call and the performance data of the respective agents in the set of agents.]

[8. The method as defined in claim 1, wherein the performance of the call is based on one or more selected from the group of sale, call handle time, retention, customer satisfaction, revenue, first call resolution, units sold, and transaction points.]

[9. The method as defined in claim 1, further comprising:

obtaining, by the one or more computers, a call type for the respective call selected from the group of sale, complaint, information request, and very important person (VIP), and wherein the matching algorithm performs matching based at least in part on the call type.]

[10. The method as defined in claim 1, wherein the matching step during a period further comprises:

switching, by the one or more computers, to using a different matching algorithm based on correlation of call performance to agent performance at a switchover point in the period.]

[11. A system of operating a call center system, comprising:

a communications component for handling calls; and one or more computers configured with the following components;

a collector configured in the one or more computers to obtain performance data for agents in a set of agents;

the collector configured in the one or more computers to obtain a respective abstracted data stream for each of multiple of the calls, with each respective data stream having multiple different locations along the abstracted data stream representing multiple different respective fields, wherein the meaning for the field data in the respective different locations for the different respective fields is not known by the system;

the collector configured in the one or more computers to determine from respective field data positions in the respective data streams respective patterns for the respective data streams;

the collector configured in the one or more computers to obtain performance data for the respective patterns; and a matching engine configured in the one or more computers with a matching algorithm to match one of the agents from the set of agents to one of the calls based at least in part on the performance data for the respective pattern of the call and based at least in part on the performance data for the respective agents of the set of agents.]

[12. The system as defined in claim 11, wherein the abstracted data stream is one selected from the group of 0's and 1's, yes and no, true and false, binary, integer, decimal, and alphanumeric.]

[13. The system as defined in claim 11, wherein abstracted data stream is scrambled, and wherein the collector is configured in the one or more computers to rearrange the data to an order of a data set to be used for correlation.]

[14. The system as defined in claim 11, wherein the collector is configured in the one or more computers to determine field positions for the fields in the abstracted data stream; and to select only the determined field positions from the data stream to form the pattern.]

[15. The system as defined in claim 11, wherein for multiple of the abstracted data streams received during the period, the abstracted data for the different fields are received in two or more different orders over the course of the period of time, and wherein the collector is further configured in the one or more computers to arrange the field data for the different fields for the data streams of the respective calls in a same order.]

[16. The system as defined in claim 11, wherein the matching engine is configured to rank the respective patterns by performance, and to perform matching based at least in part on the performance rank of the call and the performance data of the respective agents in the set of agents.]

[17. Non-transitory computer-readable media, comprising:

computer-readable program code embodied therein, to perform, when executed by one or more computers, the steps:

obtaining, by the one or more computers, performance data for agents in a set of agents;

obtaining, by the one or more computers, a respective abstracted data stream for each of multiple calls, with each respective data stream having multiple different locations along the abstracted data stream representing multiple different respective fields, wherein the meaning for the field data in the respective different locations for the different respective fields is not known by the system;

determining, by the one or more computers, from respective field data positions in the respective data streams respective patterns for the respective data streams;

obtaining, by the one or more computers, performance data for the respective patterns; and matching, by the one or more computers, using a selected matching algorithm one of the agents from the set of agents to one of the calls based at least in part on the performance data for the respective pattern of the call and based at least in part on the performance data for the respective agents of the set of agents.]

*18. A method for contact-agent pairing in a contact center system comprising:*

*receiving, by at least one computer processor communicatively coupled to and configured to operate in the contact center system, abstracted data for a first contact or a first agent;*

*pairing, by the at least one computer processor and based on the abstracted data, the first contact with one of a plurality of agents or the first agent with one of a plurality of contacts; and*

*establishing, by the at least one computer processor, in a switch module of the contact center system, a communication channel between communication equipment of the first contact or the first agent and communication equipment of one of the plurality of agents or one of the plurality of contacts, respectively, to optimize performance of the contact center system attributable to the abstracted data.*

*19. The method of claim 18, wherein respective positions of one or more data fields within the abstracted data are scrambled.*

*20. The method of claim 19, wherein the pairing based on the abstracted data further comprises determining, by the at least one computer processor, respective positions of one or more data fields within the abstracted data.*

*21. The method of claim 18, wherein respective identifiers of one or more data fields within the abstracted data are abstracted.*

*22. The method of claim 18, wherein the abstracted data includes information about at least one of:*

*sensitive contact data,*

*sensitive agent data,*

*monthly contact subscription rate,*

*customer tenure data,*

*customer phone number data, and*

*customer billing address.*

*23. The method of claim 18, wherein the at least one computer processor cannot determine respective meanings of one or more data fields within the abstracted data or respective meanings of respective identifiers of one or more data fields within the abstracted data.*

*24. The method of claim 18, wherein the pairing based on the abstracted data further comprises determining, by the at least one computer processor, correlations between the abstracted data of the first contact or the first agent and abstracted historical data of the contact center system.*

*25. A system for contact-agent pairing in a contact center system comprising:*

*at least one computer processor communicatively coupled to and configured to operate in the contact center system, wherein the at least one computer processor is further configured to:*

*receive abstracted data for a first contact or a first agent;*

*pair, based on the abstracted data, the first contact with one of a plurality of agents or the first agent with one of a plurality of contacts; and*

*establish, in a switch module of the contact center system, a communication channel between communication equipment of the first contact or the first agent and communication equipment of one of the plurality of agents or one of the plurality of contacts, respectively, to optimize performance of the contact center system attributable to the abstracted data.*

*26. The system of claim 25, wherein respective positions of one or more data fields within the abstracted data are scrambled.*

*27. The system of claim 26, wherein the at least one computer processor, configured for pairing based on the abstracted data, is further configured to determine respective positions of one or more data fields within the abstracted data.*

*28. The system of claim 25, wherein respective identifiers of one or more data fields within the abstracted data are abstracted.*

*29. The system of claim 25, wherein the abstracted data includes information about at least one of:*

*sensitive contact data,*

*sensitive agent data,*

*monthly contact subscription rate,*

*customer tenure data,*

*customer phone number data, and*

*customer billing address.*

*30. The system of claim 25, wherein the at least one computer processor cannot determine respective meanings of one or more data fields within the abstracted data or respective meanings of respective identifiers of one or more data fields within the abstracted data.*

*31. The system of claim 25, wherein the at least one computer processor, configured for pairing based on the abstracted data, is further configured to determine correlations between the abstracted data of the first contact or the first agent and abstracted historical data of the contact center system.*

*32. An article of manufacture for contact-agent pairing in a contact center system comprising:*

*a non-transitory processor readable medium; and*

*instructions stored on the medium;*

*wherein the instructions are configured to be readable from the medium by at least one computer processor communicatively coupled to and configured to operate in the contact center system and thereby cause the at least one computer processor to operate so as to:*

*receive abstracted data for a first contact or a first agent;*

*pair, based on the abstracted data, the first contact with one of a plurality of agents or the first agent with one of a plurality of contacts; and*

*establish, in a switch module of the contact center system, a communication channel between communication equipment of the first contact or the first agent and communication equipment of one of the plurality of agents or one of the plurality of contacts, respectively, to optimize performance of the contact center system attributable to the abstracted data.*

*33. The article of manufacture of claim 32, wherein respective positions of one or more data fields within the abstracted data are scrambled.*

*34. The article of manufacture of claim 33, wherein the at least one computer processor, configured for pairing based on the abstracted data, is further configured to determine respective positions of one or more data fields within the abstracted data.*

*35. The article of manufacture of claim 32, wherein respective identifiers of one or more data fields within the abstracted data are abstracted.*

*36. The article of manufacture of claim 32, wherein the abstracted data includes information about at least one of:*

*sensitive contact data,*

*sensitive agent data,*

*monthly contact subscription rate,*

*customer tenure data,*

*customer phone number data, and*

*customer billing address.*

*37. The article of manufacture of claim 32, wherein the at least one computer processor cannot determine respective meanings of one or more data fields within the abstracted data or respective meanings of respective identifiers of one or more data fields within the abstracted data.*

* * * * *